(12) United States Patent
Osumi et al.

(10) Patent No.: US 6,474,804 B2
(45) Date of Patent: Nov. 5, 2002

(54) INK, INK SET, INK-JET RECORDING PROCESS, INK CARTRIDGE, RECORDING UNIT AND INK-JET RECORDING APPARATUS

(75) Inventors: Koichi Osumi, Kanagawa (JP); Shinya Mishina, Kanagawa (JP); Hisashi Teraoka, Shizuoka (JP); Yuko Takada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/887,259

(22) Filed: Jun. 25, 2001

(65) Prior Publication Data

US 2002/0041318 A1 Apr. 11, 2002

(30) Foreign Application Priority Data

Jun. 23, 2000 (JP) ........................................ 2000-190331

(51) Int. Cl.[7] .................................................. B41J 2/01
(52) U.S. Cl. ..................... 347/100; 347/101; 106/31.58
(58) Field of Search ................................ 347/100, 101, 347/96; 106/31.58, 31.43

(56) References Cited

U.S. PATENT DOCUMENTS

| | | | |
|---|---|---|---|
| 4,313,124 A | 1/1982 | Hara | 346/140 |
| 4,345,262 A | 8/1982 | Shirato et al. | 346/140 |
| 4,459,600 A | 7/1984 | Sato et al. | 346/140 |
| 4,463,359 A | 7/1984 | Ayata et al. | 346/1.1 |
| 4,558,333 A | 12/1985 | Sugitani et al. | 346/140 |
| 4,608,577 A | 8/1986 | Hori | 346/140 R |
| 4,723,129 A | 2/1988 | Endo et al. | 346/1.1 |
| 4,740,796 A | 4/1988 | Endo et al. | 346/1.1 |
| 5,218,376 A | 6/1993 | Asai | 346/1.1 |

(List continued on next page.)

FOREIGN PATENT DOCUMENTS

| | | |
|---|---|---|
| EP | 0 735 120 A2 | 10/1996 |
| JP | 54-56847 A | 5/1979 |
| JP | 59-123670 A | 7/1984 |
| JP | 59-138461 A | 8/1984 |
| JP | 60-71260 A | 4/1985 |
| JP | 2783647 B2 | 1/1992 |
| JP | 8-104837 A | 4/1996 |
| JP | 8-193177 A | 7/1996 |
| JP | 8-290656 A | 11/1996 |
| JP | 8-302256 A | 11/1996 |

OTHER PUBLICATIONS

Database WPI, Section Ch, Week 199626, Derwent Publications Inc., with respect to JP 8–104837 A of Apr. 23, 1996.
Database WPI, Section Ch, Week 196640, Derwent Publications Inc., with respect to JP 8–193177 A of Jul. 30, 1996.
Patent Abstracts of Japan, vol. 1997, No. 03 (Mar. 31, 1997) with respect to JP 8–290656 of Nov. 5, 1996.

Primary Examiner—John Barlow
Assistant Examiner—Manish Shah
(74) Attorney, Agent, or Firm—Fitzpatrick, Cella, Harper & Scinto

(57) ABSTRACT

An ink comprise a dye, a silicon-containing surfactant, an ethylene oxide adduct of acetylene glycol and a liquid medium, wherein a weight ratio of the silicon-containing surfactant to the ethylene oxide adduct of acetylene glycol is not lower than $\frac{1}{5000}$, but lower than $\frac{1}{20}$.

An ink-jet recording process include the step of ejecting the ink by an ink-jet system.

An ink set include in combination a first dye having a certain color tone, and a second dye ink having a color tone different from that of the first dye ink, wherein at least one of the first and second dye inks is the above ink.

An ink set include dye inks of yellow, magenta and cyan, wherein the dye inks include an ethylene oxide adduct of acetylene glycol respectively, and the dye inks of magenta and cyan further have a silicon-containing surfactant.

79 Claims, 13 Drawing Sheets

U.S. PATENT DOCUMENTS

| | | | |
|---|---|---|---|
| 5,451,251 A | 9/1995 | Mafune et al. | 106/22 H |
| 5,865,883 A * | 2/1999 | Teraoka et al. | 106/31.58 |
| 5,976,233 A | 11/1999 | Osumi et al. | 106/31.86 |
| 6,027,210 A | 2/2000 | Kurabayashi et al. | 347/100 |
| 6,033,463 A | 3/2000 | Yui et al. | 106/31.27 |
| 6,048,390 A * | 4/2000 | Yano et al. | 106/31.43 |
| 6,221,141 B1 | 4/2001 | Takada et al. | 106/31.6 |
| 6,238,045 B1 | 5/2001 | Ono et al. | 347/96 |
| 6,280,513 B1 | 8/2001 | Osumi | 106/31.6 |

* cited by examiner

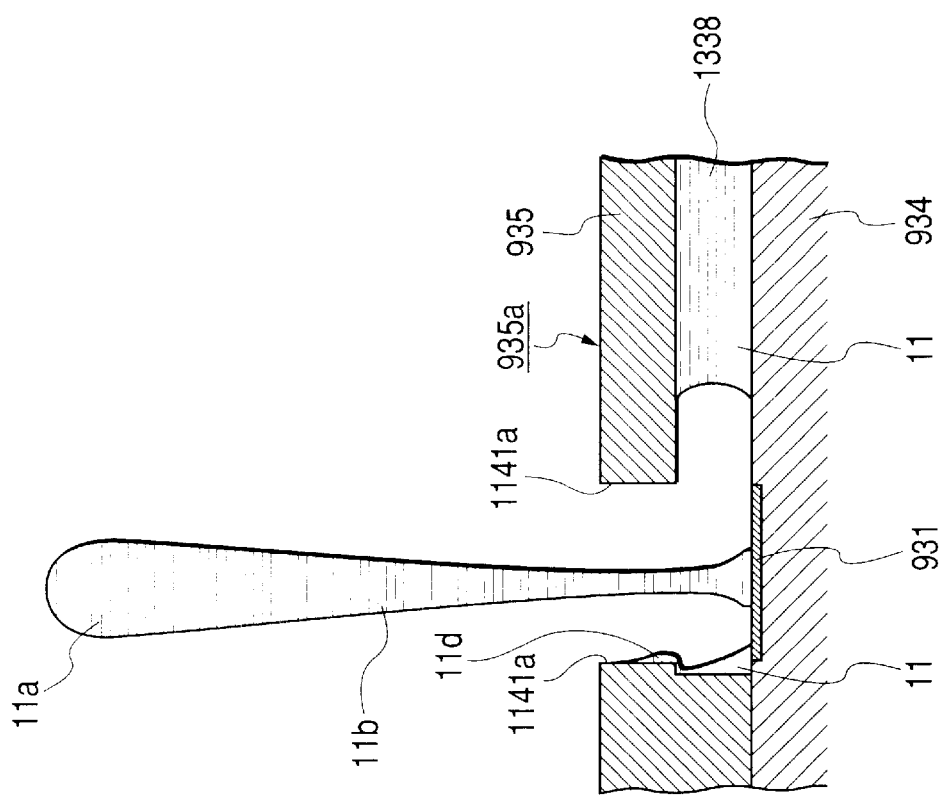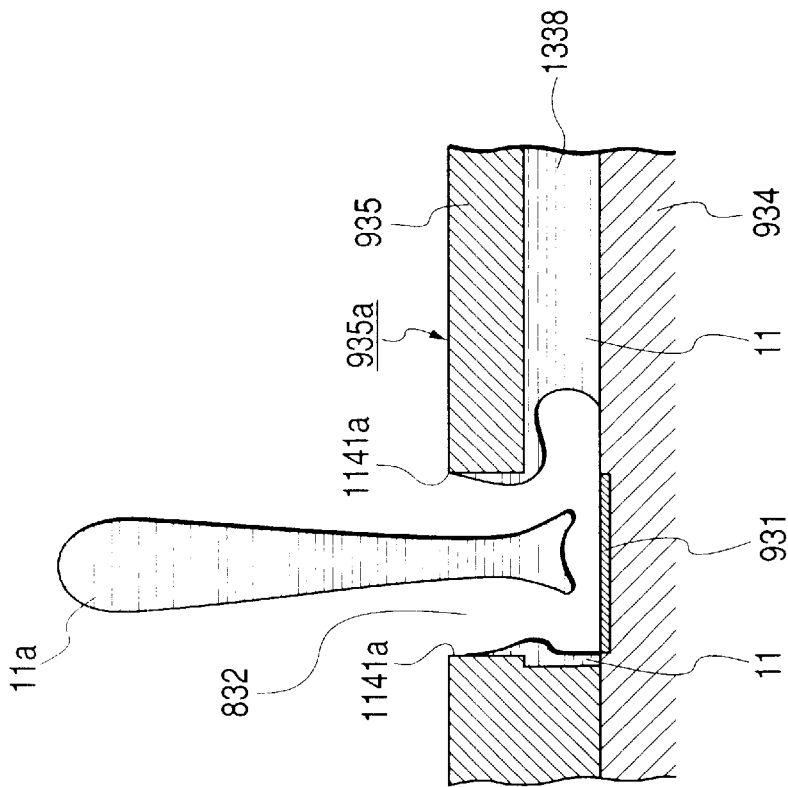

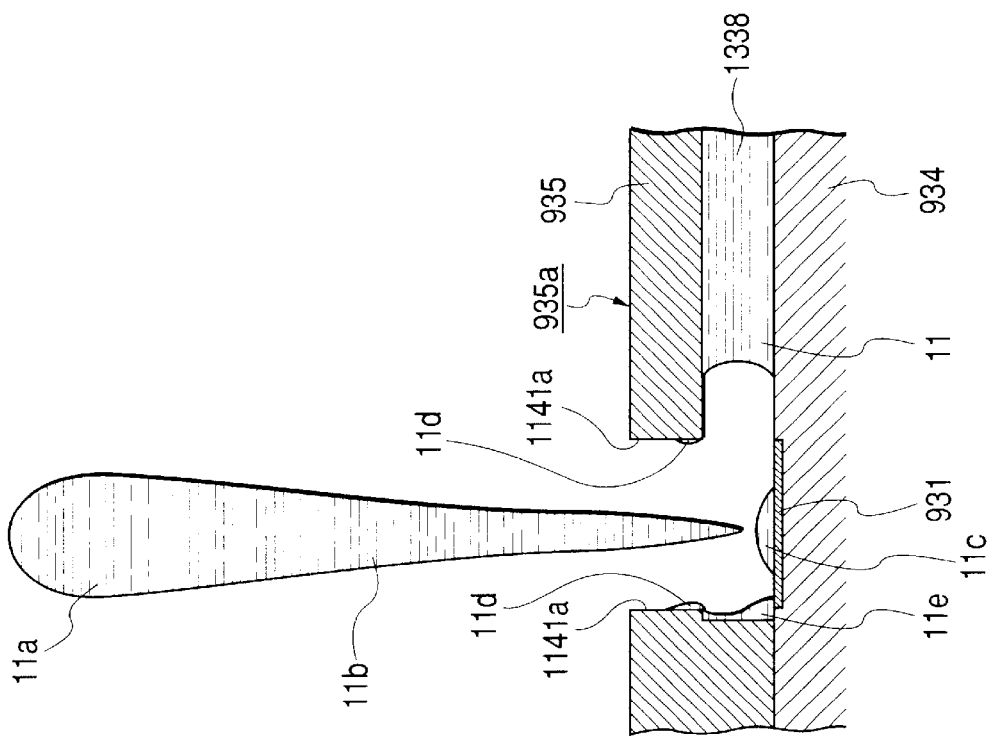
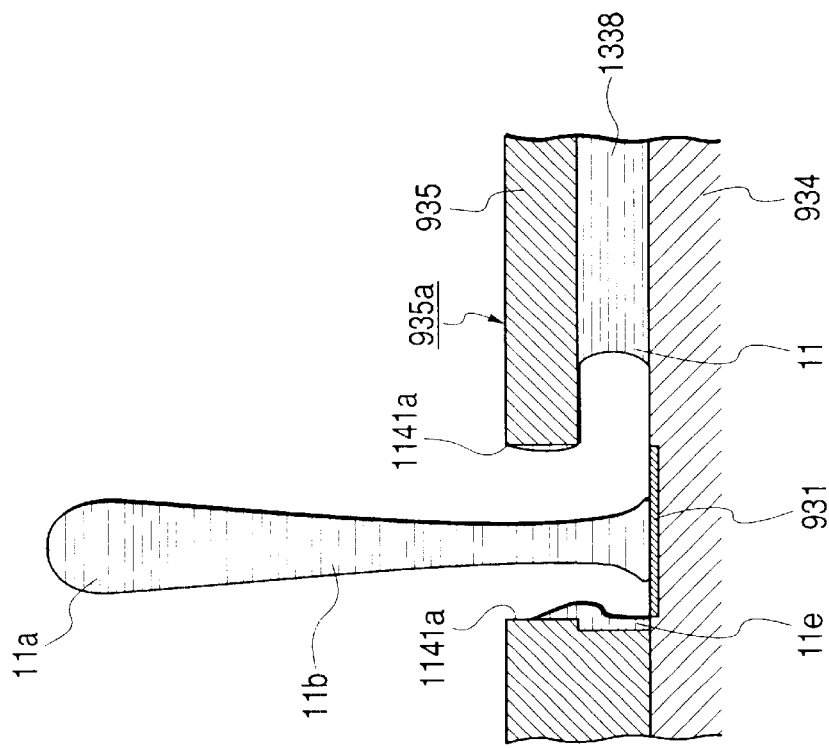

INK, INK SET, INK-JET RECORDING PROCESS, INK CARTRIDGE, RECORDING UNIT AND INK-JET RECORDING APPARATUS

BACKGROUND OF THE INVENTION

1. Field of the Invention

The present invention relates to an ink, particularly an ink suitable for use in ink-jet recording process, an ink set, an ink-jet recording process, an ink cartridge, a recording unit, an ink-jet recording apparatus, and a method of improving start-up ejection stability in an ink-jet printing ink.

2. Related Background Art

In recent years, ink-jet recorded images have been required to have high image quality comparable to silver salt photographs that is good in coloring and free of any bleeding. As an important technique for realizing still higher image quality in ink-jet color images, is mentioned control of bleeding at portions of boundaries between inks (hereinafter referred to as "bleeding" simply) when plural inks of different colors are applied adjoiningly to each other on to a recording medium (plain paper or the like). Methods for controlling bleeding include a method in which an ethylene oxide adduct of acetylene glycol, or the like is added to an ink to enhance penetrability of the ink into a recording medium. Namely, bleeding can be lessened by causing the ink to quickly penetrate into the recording medium after the ink is applied to the recording medium. For example, Japanese Patent Application Laid-Open No. 8-104837 has proposed inks comprising in combination a dye at least one of counter ions of which is an ammonium ion, and a surfactant such as an ethylene oxide adduct of acetylene glycol, by which printing having good water fastness can be conducted on various kinds of plain paper, and which is excellent in ejection stability even after stored for a long period of time.

SUMMARY OF THE INVENTION

As described in Japanese Patent Application Laid-Open No. 8-104837, it can be said that the ethylene oxide adduct of acetylene glycol is an extremely excellent surfactant which can reconcile good shelf stability and ejection stability, which are required of ink-jet inks, with good penetrability into recording media, which is required of control of bleeding. However, in the course of an investigation as to various control methods of ink-jet printers with the requirement for realization of higher image quality of ink-jet recorded images, it has been found that the inks comprising the ethylene oxide adduct of acetylene glycol, or the like involve technical problems in order to achieve a further improvement in reliability while retaining good print quality. More specifically, it has been revealed that when in the course of printing with such an ink, droplets of the ink are ejected from a certain nozzle, and the ejection of the ink from the nozzle is then stopped for a certain period of time without conducting any recovery operation, an attempt to eject a first droplet from the nozzle upon the resumption of the ejection may be accompanied by an inconvenience that the droplet is not ejected, or stable ejection is not conducted, but printing is disordered. The ejection of the first droplet after stopping the ejection for a certain period of time will hereinafter be referred to as "start-up ejection". When some inconvenience occurs in the ejection of the first droplet, such an ink is referred to as "an ink poor in stability to start-up ejection".

With the foregoing finding in view, it is accordingly an object of the present invention to provide an ink improved in stability to start-up ejection while retaining various excellent properties exhibited by inks comprising an ethylene oxide adduct of acetylene glycol.

Another object of the present invention is to provide an ink set capable of stably forming high-quality color images.

A further object of the present invention is to provide an ink-jet recording process capable of stably forming high-quality images.

A still further object of the present invention is to provide an ink-jet recording process capable of stably forming high-quality color images.

A yet still further object of the present invention is to provide an ink-jet recording apparatus capable of stably providing high-quality images, and a recording unit and an ink cartridge which can be used therein.

A yet still further object of the present invention is to provide a method of improving stability to start-up ejection of an ink-jet ink comprising an ethylene oxide adduct of acetylene glycol and a dye while retaining the excellent properties of the ink-jet ink.

A yet still further object of the present invention is to provide an ink-jet ink improved in stability to start-up ejection while retaining the excellent properties of an ink-jet ink comprising an ethylene oxide adduct of acetylene glycol and a dye.

The above objects can be achieved by the present invention described below.

According to an embodiment of the present invention, there is thus provided an ink comprising a dye, a silicon-containing surfactant, an ethylene oxide adduct of acetylene glycol, which is represented by the following structural formula (I), and a liquid medium, wherein a weight ratio of the silicon-containing surfactant to the ethylene oxide adduct of acetylene glycol is not lower than $1/5000$, but lower than $1/20$.

The ink may be provided as an ink-jet ink.

According to an embodiment of the present invention, there is also provided an ink-jet recording process, comprising the step of ejecting the ink-jet ink described above by an ink-jet system.

According to an embodiment of the present invention, there is further provided an ink cartridge, comprising an ink container portion containing the ink described above.

According to an embodiment of the present invention, there is still further provided a recording unit, comprising an ink container portion containing the ink-jet ink described above, and a recording head for ejecting the ink by an ink-jet system.

According to an embodiment of the present invention, there is yet still further provided an ink-jet recording apparatus, comprising an ink container portion containing the ink-jet ink described above, and a recording head for ejecting the ink by an ink-jet system.

According to an embodiment of the present invention, there is yet still further provided an ink set, comprising in combination a first dye having a color tone, and a second dye ink having a color tone different from that of the first dye ink, wherein at least one of the first and second dye inks is the ink described above.

According to another embodiment of the present invention, there is yet still further provided an ink set, comprising respective dye inks of yellow, magenta and cyan, wherein the dye inks comprise an ethylene oxide adduct of acetylene glycol, and the dye inks of magenta and cyan further comprise a silicon-containing surfactant.

According to an embodiment of the present invention, there is yet still further provided a method of improving stability to start-up ejection of an ink for ink-jet printing comprising a step of ejecting the ink, wherein the ink comprises an ethylene oxide adduct of acetylene glycol, a dye, and a silicon-containing surfactant.

According to an embodiment of the present invention, there is yet still further provided an ink for ink-jet printing, comprising an ethylene oxide adduct of acetylene glycol, a dye and a silicon-containing surfactant, wherein the ink exhibits excellent stability to start-up ejection even under conditions such that the ink containing no silicon-containing surfactant becomes unstable in start-up ejection.

By adopting such an embodiment, the stability to a start-up ejection can be greatly improved. Even if a start-up ejection, which means an ejection of a first droplet after stopping ejection for a certain period of time in ink-jet recording, is more or less disordered, a printed image is often scarcely affected so far as a stability to a second start-up ejection, which means an ejection following the start-up ejection, and a stability to an ejection following the second start-up ejection, are good. By making the second start-up ejection and the ejection following the second start-up ejection good, a printed image can be prevented from being greatly and adversely affected even when ejection interval is more lengthened and the start-up ejection begins to be disordered. As an another effect of the inks according to the present invention, the stability to the second start-up ejection and the stability to the ejection following the second start-up ejection are excellent, and high-quality ink-jet recorded images can be stably formed even if the start-up ejection is disordered upon ink-jet recording under a severe environment of, for example, a low temperature and a low humidity. As a further effect of the inks according to the present invention, ejection stability is made excellent, and ink-jet recording can be conducted with good results even when such an ink is continuously ejected under an environment of a low temperature.

When a weight ratio of the silicon-containing surfactant to the ethylene oxide adduct of acetylene glycol in each ink is controlled within a range of from not lower than 1/5000 to lower than ½, the improvement in stability to start-up ejection, which is a technical problem on the ink, can be achieved without impairing the excellent properties exhibited by an ink containing the ethylene oxide adduct of acetylene glycol.

Incidentally, Japanese Patent Application Laid-Open Nos. 8-290656 and 8-193177 disclose inks comprising an ethylene oxide adduct of acetylene glycol, and a silicon-containing surfactant. However, these prior art documents neither disclose anything about the technical problem of dye inks to which the ethylene oxide adduct of acetylene glycol is added to make the inks a penetrable system, nor give description suggesting the effect that the technical problem can be improved by adding a specific amount of the silicon-containing surfactant.

BRIEF DESCRIPTION OF THE DRAWINGS

FIG. 18 is a schematic cross-sectional view corresponding to a sectional form taken along line 14—14 in FIG. 13 and illustrating an ejecting operation of the liquid in the liquid-ejecting head with time together with FIGS. 14 to 17 and 19 to 21.

FIG. 19 is a schematic cross-sectional view corresponding to a sectional form taken along line 14—14 in FIG. 13 and illustrating an ejecting operation of the liquid in the liquid-ejecting head with time together with FIGS. 14 to 18, 20 and 21.

FIG. 20 is a schematic cross-sectional view corresponding to a sectional form taken along line 14—14 in FIG. 13 and illustrating an ejecting operation of the liquid in the liquid-ejecting head with time together with FIGS. 14 to 19 and 21.

FIG. 21 is a schematic cross-sectional view corresponding to a sectional form taken along line 14—14 in FIG. 13 and illustrating an ejecting operation of the liquid in the liquid-ejecting head with time together with FIGS. 14 to 20.

DESCRIPTION OF THE PREFERRED EMBODIMENTS

Figure 1:
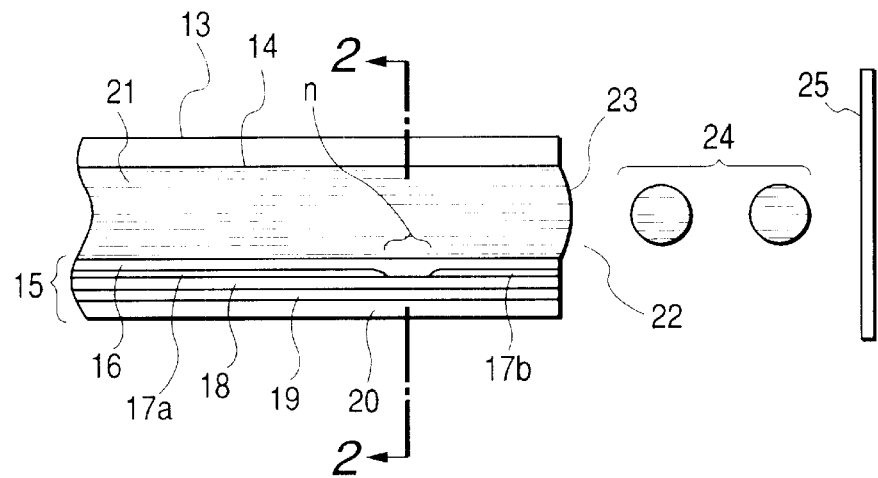
FIG. 1 is a longitudinal cross-sectional view of illustrating of an ink-jet recording apparatus according to an embodiment.

The present invention will hereinafter be described in detail.

The ink according to an embodiment of the present invention has a feature that the ink comprises a dye, an ethylene oxide adduct of acetylene glycol, a silicon-containing surfactant and a liquid medium, and a weight ratio of the silicon-containing surfactant to the ethylene oxide adduct of acetylene glycol is not lower than 1/5000, but lower than 1/20. This ink is excellent in stability to a start-up ejection, stability to the second start-up ejection and stability to the ejection following the second start-up ejection and moreover excellent in ejection stability when continuously ejected under an environment of a low temperature and a low humidity and can stably form high-quality ink-jet images.

(Ethylene Oxide Adduct of Acetylene Glycol)

As examples of the ethylene oxide adduct of acetylene glycol, may be mentioned compounds represented by the structural formula (I):

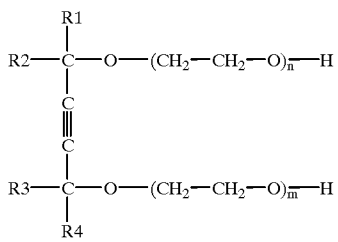

wherein $R^1$, $R^2$, $R^3$ and $R^4$ individually denote an alkyl group, specifically a linear or branched alkyl group having 1 to 4 carbon atom, and m and n individually denote an integer and m=0 and n=0 or $1 \leq m+n \leq 30$, with the proviso that m=0 or n=0 when m+n=1. The ethylene oxide adducts of acetylene glycol are substance greatly affecting the penetrability of the resulting ink into recording media. The penetrability of the ink into the recording media will hereinafter be described.

When the penetrability of an ink is expressed in terms of V as an ink quantity per $m^2$, quantity V ($mL/m^2 = \mu m$) of the ink penetrated into a recording medium upon elapsed time t after the ejection of an ink droplet is known to be represented by the following Bristow's equation $$V = Vr + Ka(t-tw)^{1/2}$$

wherein t>tw.

Right after the ink droplet is impacted on the surface of the recording medium, the ink droplet is almost absorbed in irregularities (rough portions on the surface of the recording medium) on the surface, and scarcely penetrates into the interior of the recording medium. The time during that is wet time (tw), and the quantity of the ink absorbed in the irregularities during the wet time is Vr. When the elapsed time after the application of the ink droplet exceeds the wet time tw, the penetrated quantity V increases by a quantity proportional to one half power of the excess time (t-tw). Ka is a proportionality factor of the increased quantity and shows a value according to the penetration velocity. Ka value was measured by means of a Dynamic Penetrability Tester S (trade name, manufactured by Toyo Seiki Seisaku-Sho, Ltd.) for liquid by the Bristow method. In this experiment, PB paper (product of Canon Inc. who is the present applicant) was used as the recording medium (recording paper). This PB paper is recording paper used for both copying machines and LBP using an electrophotographic system, and printers using an ink-jet recording system. The same results could be obtained even on PPC paper which is paper for electrophotography produced by Canon Inc. The Ka value is determined by the kind, amount and the like of a surfactant used. For example, when a nonionic surfactant called an ethylene oxide-2,4,7,9-tetramethyl-5-decyen-4,7-diol (a compound in which n+m is 10 in the structural formula (I); "Acetylenol EH", trade name, product of Kawaken Fine Chemicals Co., Ltd.) represented by the structural formula (I) is added, the penetrability becomes high. In the case of an ink in which no Acetylenol EH is mixed (mixing proportion: 0%), the penetrability is low, and such an ink has the nature as a surface fixing ink which will be defined subsequently. When for example, Acetylenol EH is mixed in a proportion of 1%, such an ink has a nature that it penetrates into recording paper in a short period of time and the nature as a high-penetrable ink, which will be defined subsequently, though it varies according to an ink composition such as amounts and kinds of a solvent and additives. On the other hand, an ink containing, for example, Acetylenol EH in a proportion of about 0.35% has the nature as a semi-penetrable ink between both inks though it also varies according to an ink composition such as amounts and kinds of a solvent and additives.

TABLE 1

| | Ka value ($mL/m^2/msec^{1/2}$) | Content of Acetylenol EH (%) | Surface tension (dyn/cm) |
|---|---|---|---|
| Surface fixing ink | <1 | <0.2 | ≧40 |
| Semi-penetrable ink | ≧1, but <5 | ≧0.2, but <0.7 | ≧35, but <40 |
| High-penetrable ink | ≧5 | ≧0.7 | <35 |

Table 1 shows examples of the Ka value, content (%) of Acetylenol EH and surface tension (mN/m(dyn/cm)) as to "Low-penetrable ink", "Semi-penetrable ink" and "High-penetrable ink". The penetrability of each ink into recording paper, which is a recording medium, becomes higher as Ka value is greater, namely, as the surface tension is smaller.

The Ka values in Table 1 were measured by means of a dynamic penetrability tester S (manufactured by Toyo Seiki Seisaku-Sho, Ltd.) for liquid by Bristow method as described above. In this experiment, PB paper (product of Canon Inc.) described above was used as recording paper. The same results could be obtained even on PPC paper (product of Canon Inc.) described above. An ink of a system defined as "high-penetrable ink" contains Acetylenol EH in a proportion of at least 0.7% and gains good results as to penetrability. When the dye ink according to this embodiment is a color (chromatic) ink, the Ka value is preferably controlled to the Ka value of "semi-penetrable ink" or greater, i.e. 1.0 ($mL/m^2/msec^{1/2}$) or greater as a standard of penetrability of the ink, with at least 5 ($mL/m^2/msec^{1/2}$) being particularly preferred from the viewpoint of preventing bleeding between color inks.

(Silicon-containing Surfactant)

As the silicon-containing surfactant, is preferably used that having, for example, a siloxane bond.

An ink-jet printer may possibly be used under various environments. In particular, evaporation of an ink in an ejection nozzle of the ink-jet printer tends to occur under an environment of a low humidity. As described in Japanese Patent Application Laid-Open No. 8-302256, it is known that an anti-foaming agent such as a silicon-containing surfactant is contained in an ink, whereby the surface of the ink is covered with a film of the anti-foaming agent to prevent the evaporation of the ink, and stability to start-up ejection of the ink is improved.

In such an ink, the anti-foaming agent such as the silicon-containing surfactant cannot remain dissolved in the ink due to the evaporation of the ink in the ejection nozzle, and further evaporation of the ink caused by temperature rise of the ink in the ejection nozzle by applying thermal energy in the case where an ink-jet printer is a thermal ink-jet printer in which thermal energy according to a recording signal is applied to an ink within a recording head to generate a droplet by the thermal energy, thereby being isolated as an oil component. The oil component is left in the vicinity of the nozzle, which forms the cause of printing disorder. Further, when the anti-foaming agent deposited as the oil component is hard to be dissolved again in the ink, in other words, the anti-foaming agent is poor in solubility in the ink, the oil component left in the vicinity of the nozzle is hard to be dissolved again in the ink. Therefore, it is considered that not only stability to start-up ejection, but also stability to second start-up ejection and stability to an ejection following the second start-up ejection are adversely affected. In addition, it is considered that ejection stability upon continuous ejection is also adversely affected due to accumulation of the oil component. Further, the oil component tends to form the cause of kogation on a heater which gives an ink thermal energy. The kogation is not preferable because the thermal energy applied from the heater to the ink is adversely affected.

Silicon-containing surfactants (including those having no anti-foaming effect) having a solubility of at least 1% in water at 25° C. are preferably used in the present invention. By using such a silicon-containing surfactant, the silicon-containing surfactant is prevented from failing to remain dissolved in the ink by evaporation of the ink in an ejection nozzle to be isolated as an oil component, and the ejection stability of the ink is prevented from being worsened due to occurrence of ejection slippage, or the like.

It is also considered that the fact that the above-described anti-foaming agent becomes oily to cause color irregularity when an ink becomes a concentrated state on a recording medium due to evaporation of the ink, and the like right after applying the ink to the recording medium can be prevented by changing the anti-foaming agent to the silicon-containing surfactant having a solubility of at least 1% in water at 25° C.

It has been confirmed that the silicon-containing surfactant satisfying the above conditions irrespective of anti-foaming effect exhibits excellent effects on the stability to start-up ejection, stability to second start-up ejection and stability to an ejection following the second start-up ejection and moreover ejection stability when continuously ejected under an environment of a low temperature and a low humidity in an ink-jet recording apparatus, and an ink containing such a surfactant exhibits an excellent effect on ejection properties when used in an ink-jet printer. Therefore, the silicon-containing surfactant does not need to be an anti-foaming agent.

Specific examples of the silicon-containing surfactant include L-720, L-7001, L-7002, L-7604, FZ-2113, FZ-2105, Y-7006, FZ-2120, FZ-2161, FZ-2162, FZ-2163, FZ-2164 and FZ-2166 (all, products of Nippon Unicar Co., Ltd.), but the present invention is not limited to these surfactants.

The content of the silicon-containing surfactant in the ink is preferably within a range of from 0.001 to 4.5% by weight, and a ratio (weight ratio) of the silicon-containing surfactant to the ethylene oxide adduct of acetylene glycol contained in the ink preferably satisfies conditions of not lower than $1/5000$, but lower than $1/20$ (amount of the silicon-containing surfactant/amount of the ethylene oxide adduct of acetylene glycol).

More specifically, when the content of the silicon-containing surfactant satisfies the above conditions, the stability to start-up ejection of the ink can be improved without impairing the preferred effects of an ink containing the ethylene oxide adduct of acetylene glycol, i.e. excellent penetrability of the ink into recording media and stable long-term shelf stability of the ink. Although the penetrability of the ink into recording media can be improved by only the silicon-containing surfactant, the ink using the ethylene oxide adduct of acetylene glycol as a main agent for improving the penetrability more clearly exhibits good results from the viewpoint of ink-jet ejection properties, shelf stability and the like of the ink.

The reason why the ink, the content of the silicon-containing surfactant in which is controlled to not lower than $1/5000$, but lower than $1/20$ in terms of the weight ratio to the amount of the ethylene oxide adduct of acetylene glycol, has greater improving effects on the stability to start-up ejection, stability to second start-up ejection and stability to an ejection following the second start-up ejection and moreover on ejection stability when continuously ejected under an environment of a low temperature and a low humidity than those, the content of the surfactant in which is controlled outside this range, is not clearly known. However, it is considered that evaporation of water from the ink in the vicinity of a nozzle of an ink-jet printer head affects the effects.

In order to prevent the silicon-containing surfactant from failing to be dissolved in the ink and being isolated from the ink to cause accumulation of an oil component as described above, the silicon-containing surfactant in the ink is preferably kept at a state completely dissolved in the ink. Therefore, when the silicon-containing surfactant is contained in a proportion of, for example, 4.5% by weight based on the total weight of the ink, a silicon-containing surfactant having a solubility of at least 4.5% is preferably chosen for use.

Coloring materials used in the present invention can be suitably chosen for use, and most of the conventionally known dyes and pigments are useful. Dyes effectively used in the present invention satisfy such reliability as ink as described above, and examples thereof generally include direct dyes, basic dyes, acid dyes, food colors, vat dyes, soluble vat dyes, disperse dyes, oil-soluble dyes and mordant dyes, and besides water-soluble or oil-soluble dyes such as nuren dyes, naphthol dyes, reactive dyes, chrome dyes, azoic dyes and cationic dyes. Among these, water-soluble direct dyes, basic dyes and acid dyes are particularly preferred. The content of these coloring material in the ink is within a range of from 0.1 to 15% by weight, preferably from 0.1 to 10% by weight.

As examples of inks that the present invention particularly effectively functions, are mentioned cyan inks comprising C.I. Direct Blue 199 as a coloring material, and magenta inks comprising a coloring material represented by the structural formula (II):

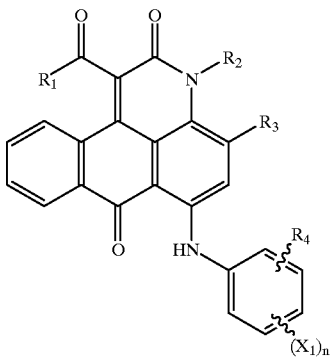

wherein $R_1$ denotes a substituted or unsubstituted alkoxy group, or a substituted or unsubstituted aryl group; $R_2$ and $R_4$ individually denote hydrogen or a substituted or unsubstituted alkyl group; $R_3$ denotes hydrogen, a substituted or unsubstituted alkyl group, a substituted or unsubstituted alkoxy group, a substituted or unsubstituted aryloxy group or halogen; $X_1$ denotes a carboxyl group or a salt thereof, or a sulfonic acid or a salt thereof, and n is 1 or 2. In order to improve the tint of images formed with the magenta inks, the magenta inks may be inks further comprising at least one selected from the group consisting of C.I. Acid Red 52, C.I. Acid Red 289 and a coloring material represented by the following structural formula (III):

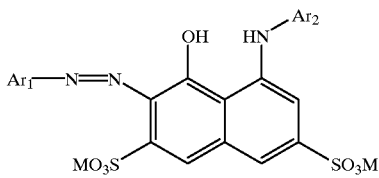

wherein $Ar_1$ denotes a substituted or unsubstituted phenyl group, or a substituted or unsubstituted naphthyl group; $Ar_2$ denotes any one selected from the group consisting of an acetyl, benzoyl, 1,3,5-triazinediyl, $SO_2$—$C_6H_5$ and $SO_2$—$C_6H_4$—$CH_3$ groups; and M is a counter ion to the sulfonic group and denotes any one selected from the group consisting of hydrogen, alkali metal, ammonium and organic ammonium.

Namely, the present inventors have confirmed that in these inks, unstabilization to start-up ejection performance of the inks when the ethylene oxide adduct of acetylene glycol is added tends to occur even under comparatively moderate conditions compared with other inks. When these inks are used in combination with other inks, such limitations that head control of a printer, for example, frequency of preliminary ejection, must be designed on the basis of an ink relatively low in start-up ejection performance may be imposed on a printer used. However, the silicon-containing surfactant is added to these inks, whereby the same performance as to stability to start-up ejection as other inks can be imparted to these inks, and so such limitations in the design of the ink-jet printer as described above can be eliminated.

Besides the above components, additives such as a water-soluble organic solvent, a surfactant, a pH adjustor, a rust preventive, a mildewproofing agent, an antioxidant, an evaporation accelerator, a chelating agent and a water-soluble polymer may be added to the inks according to the present invention, as needed.

As a liquid medium dissolving the coloring material, silicon-containing surfactant and ethylene oxide adduct of acetylene glycol used in the present invention therein, is preferred water or an aqueous medium composed mainly of water. The aqueous medium may be water alone or a mixture of water and a water-soluble organic solvent. Specific examples of the water-soluble organic solvent include amides such as dimethylformamide and dimethylacetamide; ketones such as acetone; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 1,3-dimethyl-2-imidazolidinone; sulfolane; dimethyl sulfoxide; cyclic amide compounds such as 2-pyrrolidone and ε-caprolactam; and imide compounds such as succinimide. The content of the water-soluble organic solvents in the inks is generally within a range of preferably from 1 to 40% by weight, more preferably from 3 to 30% by weight, based on the total weight of each ink. The content of water in the inks is generally within a range of from 30 to 95% by weight based on the total weight of each ink.

The inks according to the present invention may also be used as inks for general water-based writing utensils, but are particularly suitable for use in an ink-jet recording system of a type that an ink is ejected by the bubbling phenomenon of the ink caused by thermal energy. This recording system has a feature that the ejection of the ink becomes extremely stable, and no satellite dots generate. In this case, however, the thermal properties (for example, the specific heat, the coefficient of thermal expansion, the heat conductivity, etc.) of the inks may be controlled in some cases.

From the viewpoint of making the matching of the inks with an ink-jet head good, the inks according to the present invention may desirably be controlled so as to have, as their own physical properties at 25° C., a surface tension of 30 to 68 mN/m (dyn/cm) and a viscosity of 15 cP or lower, preferably 10 cP or lower, more preferably 5 cP or lower.

As a preferred method and apparatus for conducting recording by using the inks according to the present invention, may be mentioned an ink-jet recording method and an ink-jet recording apparatus in which thermal energy corresponding to recording signals is applied to an ink within a recording head, and ink droplets are generated by the thermal energy.

Figure 2:
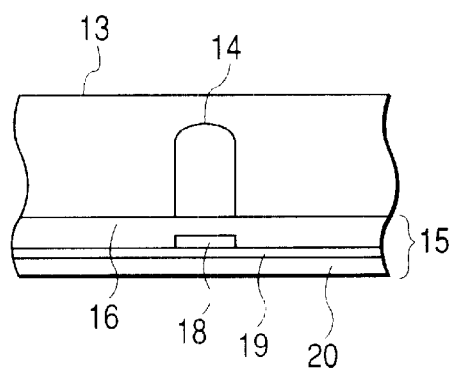
FIG. 2 is a cross-sectional view taken along line 2—2 in FIG. 1.
Figure 3:
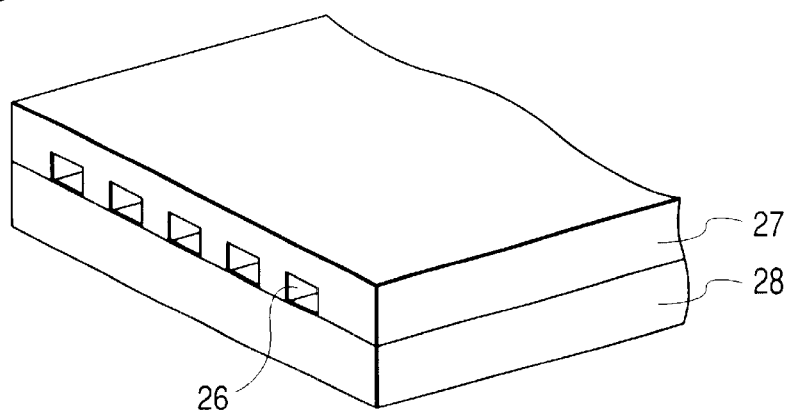
FIG. 3 schematically illustrates a multi-head.

Examples of the construction of a head, which is a main component of such an apparatus, are illustrated in FIGS. 1, 2 and 3. A head 13 is formed by bonding a glass, ceramic, silicon or plastic plate or the like having a groove 14 through which an ink is passed, to a heating head 15 which is used for thermal recording (the drawings show a head to which, however, the invention is not limited). The heating head 15 is composed of a protective film 16 made of silicon oxide or the like, aluminum electrodes 17a and 17b, a heating resistor layer 18 made of nichrome or the like, a heat accumulating layer 19, and a substrate 20 made of alumina or the like having a good heat radiating property. An ink 21 comes up to an ejection orifice (a minute opening) 22 and forms a meniscus 23 due to a pressure not illustrated.

Now, upon application of electric signals to the electrodes 17a and 17b of the head 13, the heating substrate 15 rapidly generates heat at the region shown by "n" to form bubbles in the ink 21 which is in contact with this region. The meniscus 23 of the ink is projected by the pressure thus produced, and the ink 21 is ejected in the form of ink droplets 24 from the ejection orifice 22 toward a recording medium 25.

FIG. 3 illustrates an appearance of a multi-head composed of an array of a number of heads as shown in FIG. 1. The multi-head is formed by closely bonding a glass plate 27 having a number of grooves 26 to a heating head 28 similar to that described in FIG. 1.

Figure 4:
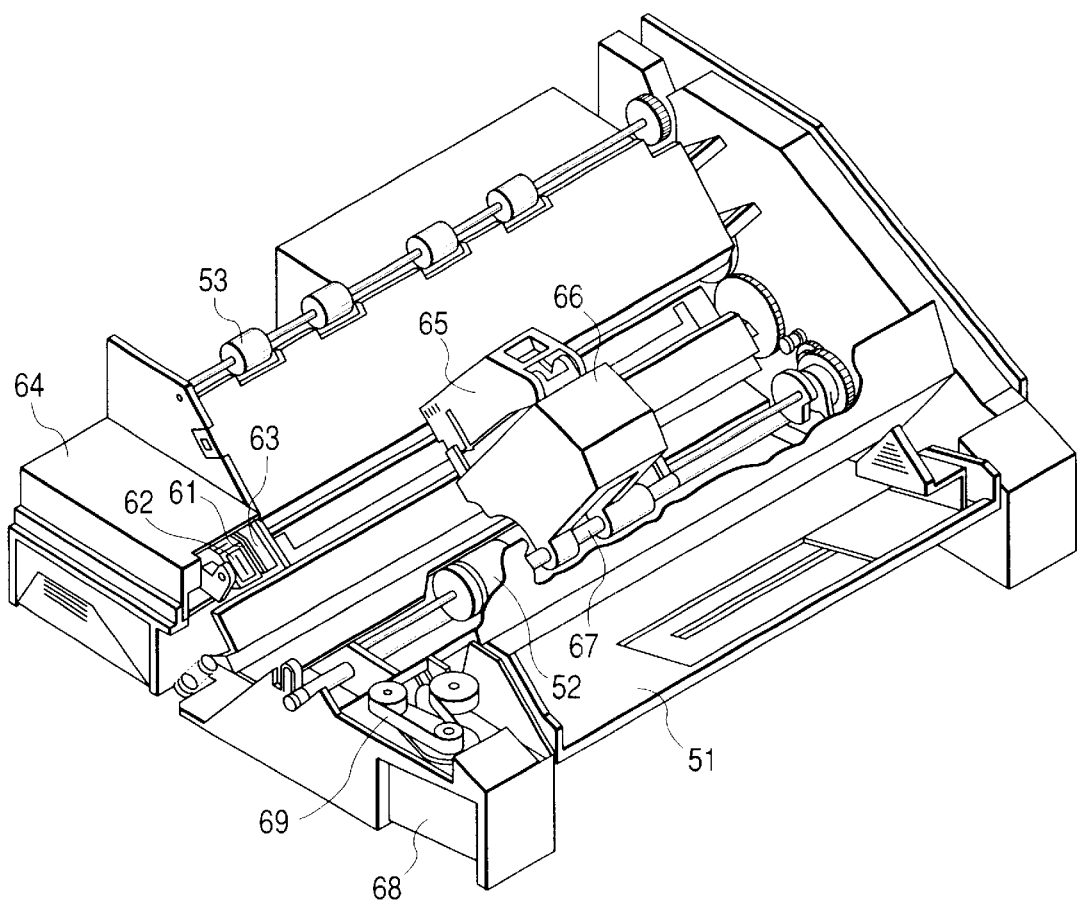
FIG. 4 is a schematic perspective view illustrating an ink-jet recording apparatus according to an embodiment.

Incidentally, FIG. 1 is a cross-sectional view of the head 13 taken along the flow path of the ink, and FIG. 2 is a cross-sectional view taken along line 2—2 in FIG. 1. FIG. 4 illustrates an example of an ink-jet recording apparatus in which such a head as described above has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved. Reference numeral 62 indicates a cap which is provided at a home position adjacent to the blade 61, and is so constructed that it moves in a direction perpendicular to a direction in which the recording head 65 is moved, and comes into contact with the face of ejection openings to cap it. Reference numeral 63 denotes an ink absorbing member provided adjoiningly to the blade 61 and, similar to the blade 61, held in such a form that it protrudes into the course through which the recording head 65 is moved. The above-described blade 61, cap 62 and ink absorbing member 63 constitute an ejection-recovery portion 64, where the blade 61 and ink absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto.

Reference numerals 51 and 52 denote a feeding part from which the recording medium is inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the ejection-recovery portion 64 is receded from the path of motion of the recording head 65 when the recording head 65 is returned to its home position after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
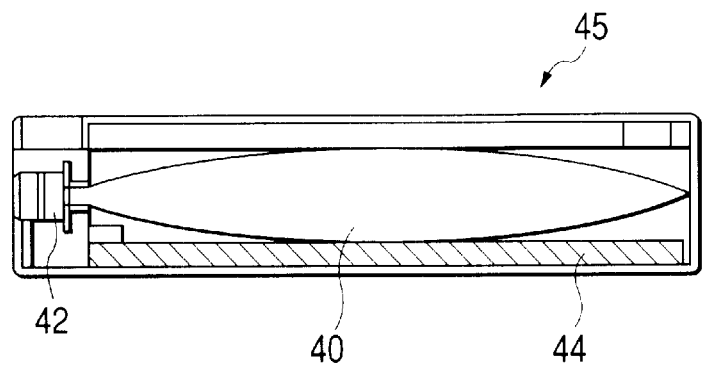
FIG. 5 is a longitudinal cross-sectional view illustrating an ink cartridge according to an embodiment.

FIG. 5 illustrates an exemplary ink cartridge 45 in which an ink to be fed to a head through a member for feeding the ink, for example, a tube is contained. Here, reference numeral 40 designates an ink container portion containing the ink to be fed, as exemplified by a bag for ink. One end thereof is provided with a stopper 42 made of rubber. A needle (not illustrated) may be inserted into this stopper 42 so that the ink in the bag 40 for ink can be fed to the head. Reference numeral 44 indicates an ink absorbing member for receiving a waste ink. It is preferred that the ink container portion 40 be comprised of at least one material selected from the group consisting of polypropylene, polyurethane, cellulose, polyvinyl acetate and so forth at its surface with which the ink comes into contact.

The ink-jet recording apparatus used in the present invention are not limited to the apparatus as described above in which the head and the ink cartridge are separately provided. Therefore, a device in which these members are integrally formed as shown in FIG. 6 can also be preferably used.

Figure 6:
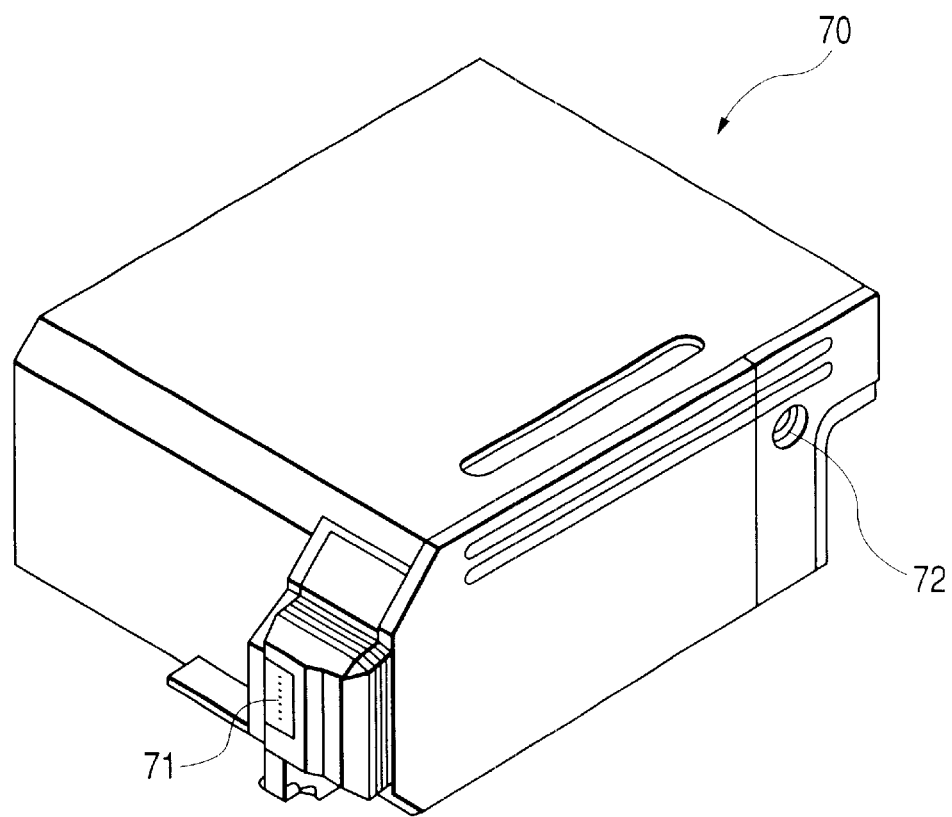
FIG. 6 is a perspective view illustrating an exemplary printing unit.

In FIG. 6, reference numeral 70 designates a recording unit, in the interior of which an ink container portion containing an ink, for example, an ink absorbing member, is contained. The recording unit 70 is so constructed that the ink in such an ink absorbing member is ejected in the form of ink droplets through a head 71 having a plurality of orifices. In the present invention, polyurethane and polypropylene are preferably used as a material for the ink absorbing member.

Reference numeral 72 indicates an air passage for communicating the interior of the recording unit 70 with the atmosphere. This recording unit 70 is used in place of the recording head 65 shown in FIG. 4, and is detachably installed on the carriage 66.

Other specific examples of the recording apparatus and recording heads preferably used in the present invention will hereinafter be described.

Figure 7:
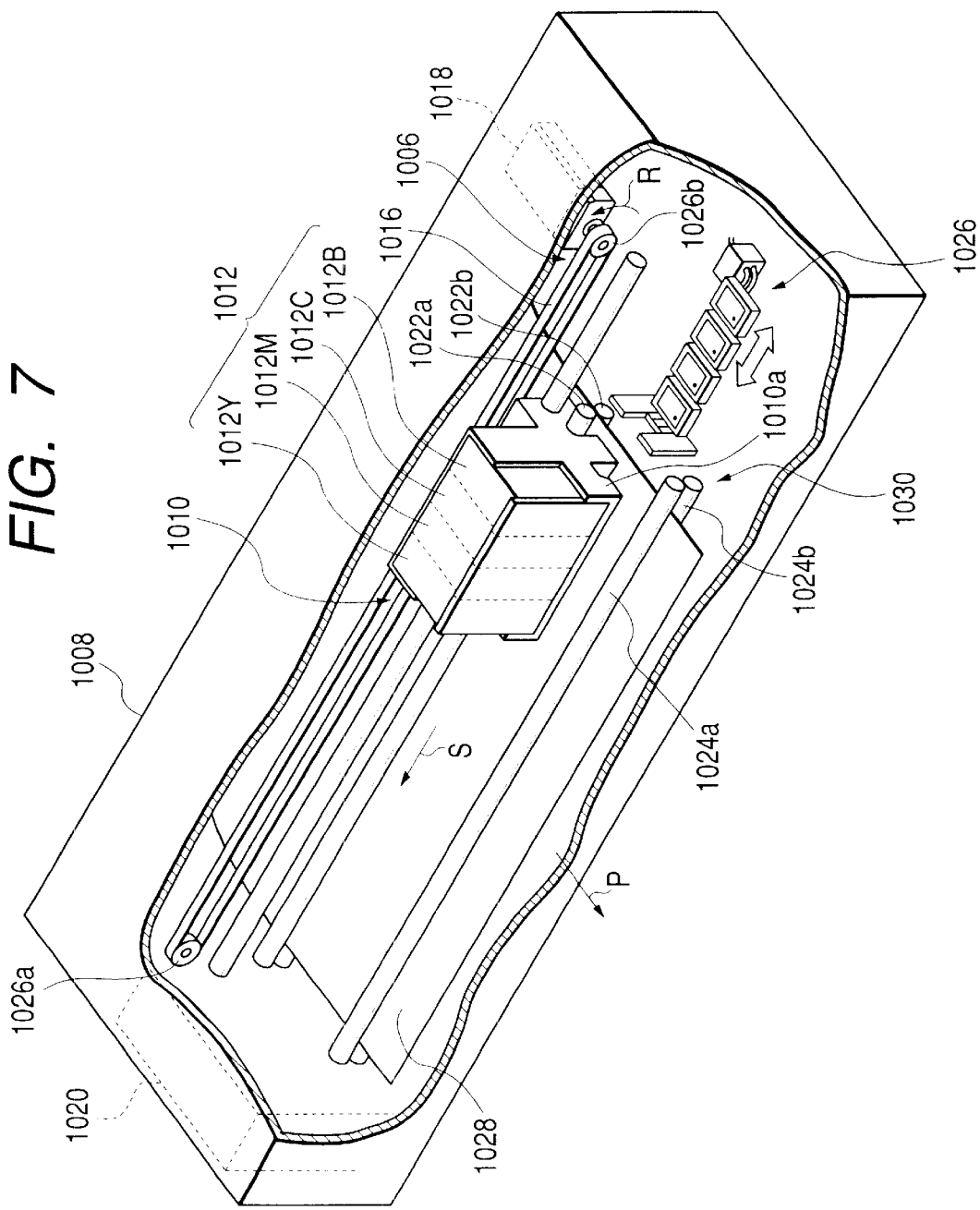
FIG. 7 is a schematic perspective view illustrating principal parts in an exemplary ink-jet printer capable of installing a liquid-ejecting head.

FIG. 7 is a schematic perspective view illustrating principal parts of a liquid-ejecting head of an ejection system that a bubble communicates with the air upon ejection, and an exemplary ink-jet printer as a liquid-ejecting apparatus using this head. In FIG. 7, the ink-jet printer comprises a conveying device 1030 for intermittently conveying paper 1028 as a recording medium provided along the longitudinal direction in a casing 1008 in a direction shown by an arrow P in FIG. 7, a recording part 1010 reciprocatingly moved in a direction substantially parallel to a direction S substantially perpendicular to the conveying direction P of the paper 1028 by the conveying device 1030, and a driving part 1006 for movement as a driving means for reciprocatingly moving the recording part 1010.

The conveying device 1030 comprises a pair of roller units 1022a and 1022b and a pair of roller units 1024a and 1024b arranged in substantial parallel with and in opposed relation to each other, and a driving part 1020 for driving these respective roller units. By this construction, the paper 1028 is intermittently conveyed in a state that it is held between the respective roller units 1022a and 1022b and the roller units 1024*a* and 1024*b* in a direction shown by the arrow P in FIG. 7 when the driving part 1020 is operated.

The driving part 1006 for movement comprises a belt 1016 wound around pulleys 1026*a* and 1026*b* respectively provided on rotating shafts oppositely arranged at a prescribed interval and a motor 1018 for driving the belt 1016 joined to a carriage member 1010*a* of the recording part 1010 arranged in substantial parallel to the roller units 1022*a* and 1022*b* in forward and reverse directions.

When the motor 1018 is operated to rotate the belt 1016 in a direction shown by an arrow R in FIG. 7, the carriage member 1010*a* of the recording part 1010 is moved by the prescribed movement in the direction shown by the arrow S in FIG. 7. When the motor 1018 is operated to rotate the belt 1016 in a direction reverse to the direction shown by the arrow R in FIG. 7, the carriage member 1010*a* of the recording part 1010 is moved by the prescribed movement in a direction reverse to the direction shown by the arrow S in FIG. 7. At an end of the driving part 1006 for movement, a recovery unit 1026 for conducting an ejection-recovery treatment for the recording part 1010 is provided in opposed relation to an array of ink-ejection openings of the recording part 1010 at the home position of the carriage member 1010*a*.

In the recording part 1010, ink-jet cartridges (hereinafter may be referred merely to as "cartridges" in some cases) 1012Y, 1012M, 1012C and 1012B for respective colors, for example, yellow, magenta, cyan and black, are detachably mounted on a carriage member 1010*a*.

Figure 8:
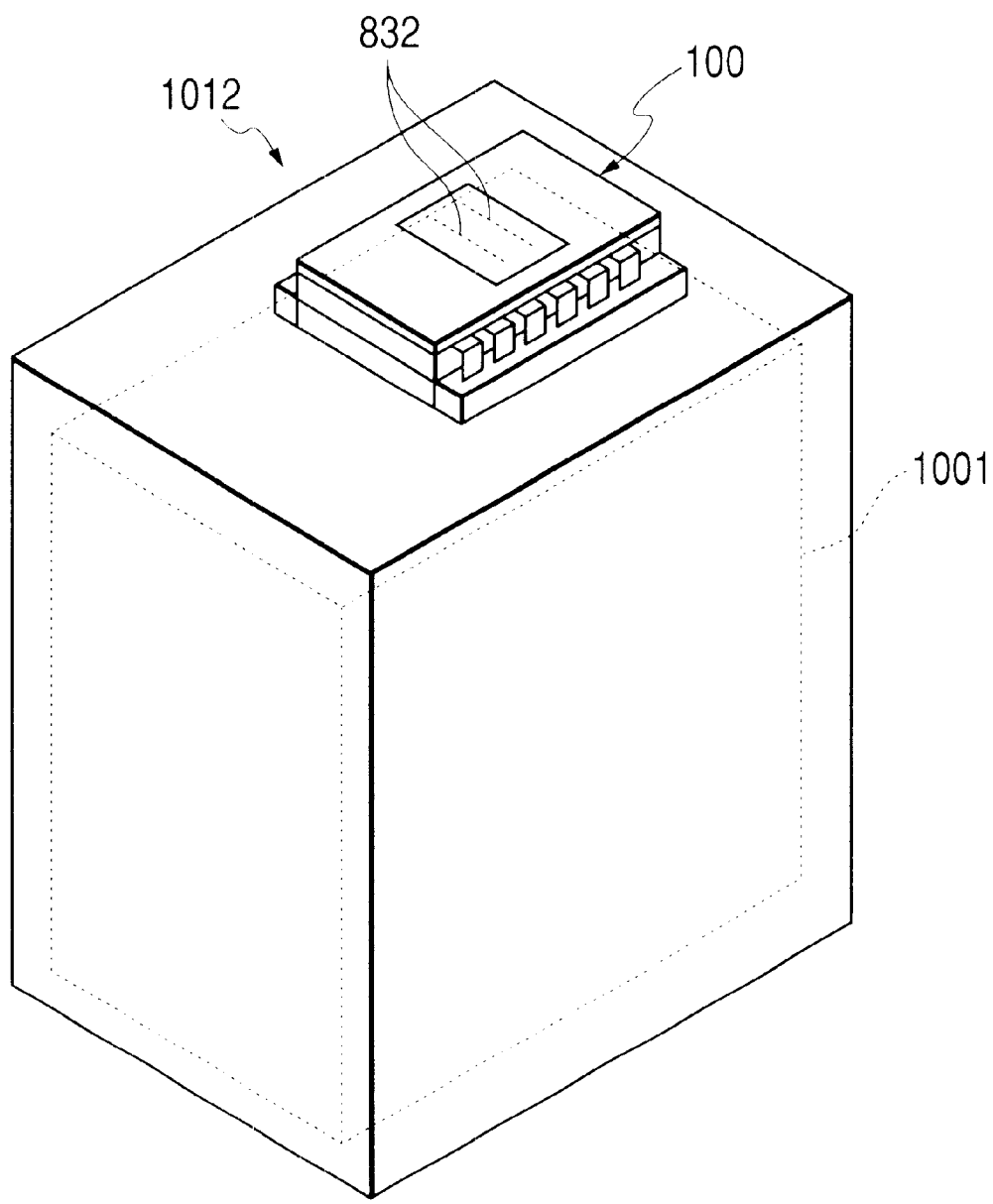
FIG. 8 is a schematic perspective view illustrating an exemplary ink-jet cartridge equipped with a liquid-ejecting head.

FIG. 8 illustrates an exemplary ink-jet cartridge capable of being mounted on the above-described ink-jet recording apparatus. The cartridge 1012 in this embodiment is of a serial type, and its principal part is constructed by an ink-jet recording head 100 and a liquid tank 1001 for containing a liquid such as an ink. In the ink-jet recording head 100, a great number of ejection openings 832 for ejecting the liquid is formed, and the liquid such as an ink is directed to a common liquid chamber (see FIG. 9) in the liquid-ejecting head 100 through a liquid feed passage (not illustrated) from the liquid tank 1001. The cartridge 1012 is so constructed that the ink-jet recording head 100 and the liquid tank 1001 are integrally formed, and the liquid can be supplied to the interior of the liquid tank 1001 as needed. However, a structure that the liquid tank 1001 is replaceably joined to this liquid-ejecting head 100 may also be adopted.

A specific example of the above-described liquid-ejecting head capable of being mounted on the ink-jet printer of such a construction will hereinafter be described in detail.

Figure 9:
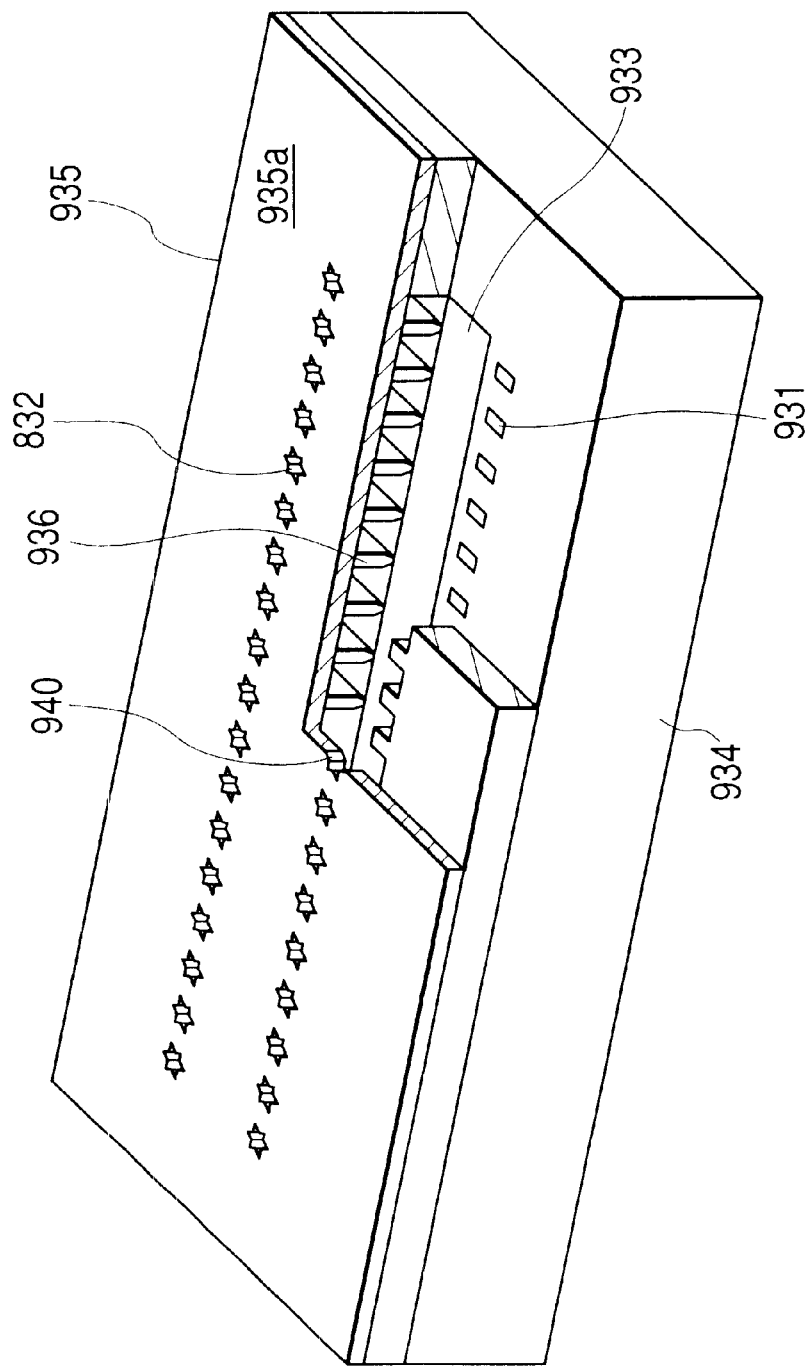
FIG. 9 is a schematic perspective view typically illustrating principal parts of an exemplary liquid-ejecting head.

FIG. 9 is a schematic perspective view typically illustrating principal parts of a liquid-ejecting head showing the basic form of the present invention, and FIGS. 10 to 13 are front views illustrating the form of ejection openings of the liquid-ejecting head shown in FIG. 9. Incidentally, electrical wiring and the like for driving electrothermal conversion elements are omitted.

In the liquid-ejecting head according to this embodiment, such a substrate 934 composed of glass, ceramic, plastic or metal as illustrated in, for example, FIG. 9 is used. The material of such a substrate is not essential to the present invention and is not particularly limited so far as it functions as a part of a flow-path forming member and as a support for an ink ejection-energy-generating element, and a material layer for forming a liquid flow path and ejection openings, which will be described subsequently. Therefore, in this embodiment, the description is given in the case where an Si substrate (wafer) is used. The ejection openings can be formed in accordance with not only a forming process by laser beam, but also, for example, a process in which a photosensitive resin is used as an orifice plate (ejection-opening plate) 935, which will be described subsequently, to form ejection openings by an aligner such as MPA (mirror projection aligner).

In FIG. 9, reference numeral 934 indicates a substrate equipped with electrothermal conversion elements (hereinafter may be referred as "heater" in some cases) 931 and an ink feed opening 933 formed of a long-grooved through-opening as a common liquid chamber. The heaters 931, which are thermal energy-generating means, are arranged in a zigzag form in a row on both sides of the ink feed opening 933 along the longitudinal direction thereof with an interval of, for example, 300 dpi between the electrothermal conversion elements. Walls 936 for ink flow path for forming ink flow paths are provided on the substrate 934. Further, an ejection-opening plate 935 equipped with ejection openings 832 is provided on the walls 936 for ink flow path.

In FIG. 9, the walls 936 for ink flow path and the ejection-opening plate 935 are illustrated as separate members. However, the walls 936 for ink flow path may be formed on the substrate 934 by a method such as spin coating, thereby forming the walls 936 for ink flow path and the ejection-opening plate 935 as the same member at the same time. In this embodiment, the side of the ejection-opening face (upper surface) 935*a* is subjected to a water-repellent treatment.

In this embodiment, a head of the serial type that recording is conducted while scanning in the direction shown by the arrow S in FIG. 7 is used to conduct recording at, for example, 1,200 dpi. Driving frequency is 10 kHz, and ejection is conducted at the shortest time interval of 100 $\mu$s in one ejection opening.

Figure 10:
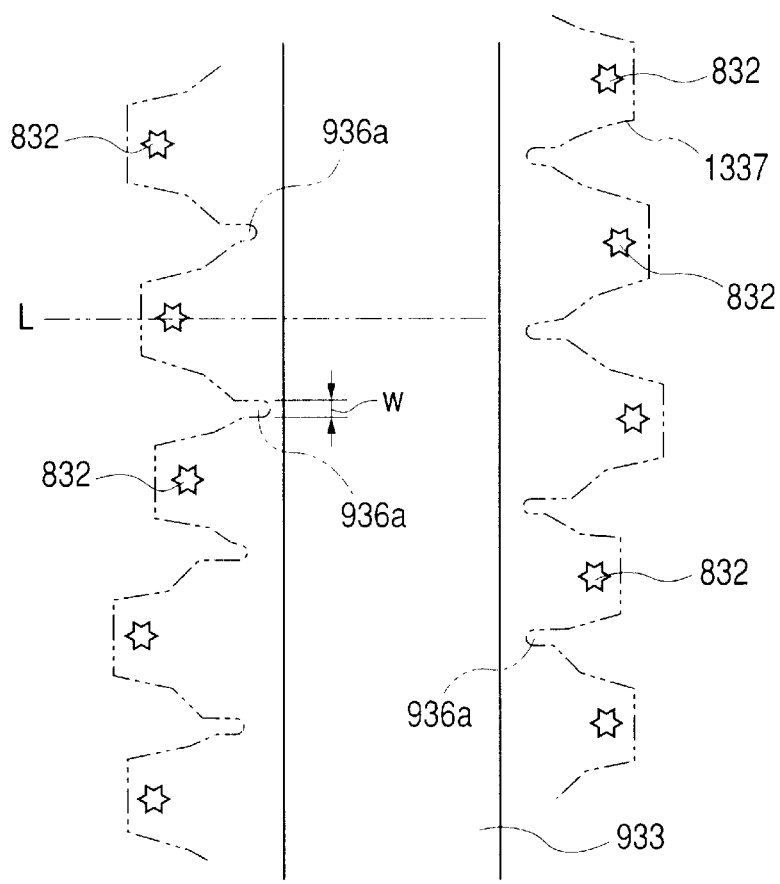
FIG. 10 is a conceptual view illustrating a part extracted from the exemplary liquid-ejecting head.
Figure 13:
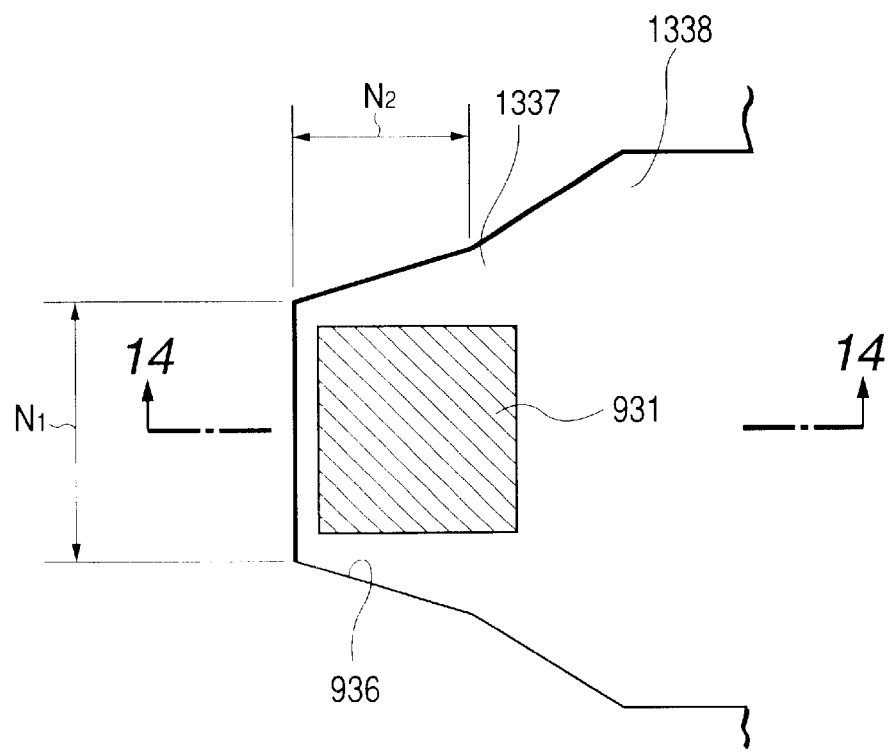
FIG. 13 typically illustrates a principal part in FIG. 10.

As an example of dimensions of the head, a partition wall 936*a* for isolating adjacent nozzles from each other from the viewpoint of fluid has a width w of 14 $\mu$m as illustrated in, for example, FIG. 10. As illustrated in FIG. 13, a bubbling chamber 1337 formed by the walls 936 for ink flow path has $N_1$ (width of the bubbling chamber) of 33 $\mu$m and $N_2$ (length of the bubbling chamber) of 35 $\mu$m. The size of the heater 931 is 30 $\mu$m×30 $\mu$m, the resistance value of the heater is 53 $\Omega$, and driving voltage is 10.3 V. A head in which the heights of the wall 936 for ink flow path and the partition wall 936*a* are 12 $\mu$m, and the thickness of the ejection-opening plate is 11 $\mu$m may be used.

In the section of an ejection opening part 940 provided in the ejection-opening plate including ejection openings 832, the form of a section taken along a direction intersecting the ejecting direction (thickness-wise direction of the orifice plate 935) of the ink is a substantially star form and is generally formed by 6 projected portions 832*a* having a corner of an obtuse angle and 6 recessed portions 832*b* alternately arranged between these projected portions 832*a* and having a corner of an acute angle. More specifically, 6 grooves 1141 are formed in the thickness-wise direction (ejecting direction of the liquid) of the orifice plate shown in FIG. 9 by using the recessed portion 832*b* locally distant from the center O of the ejection opening as a top thereof and the projected portion 832*a* adjacent to this region and locally near from the center O of the ejection opening as a base.

Figure 11:
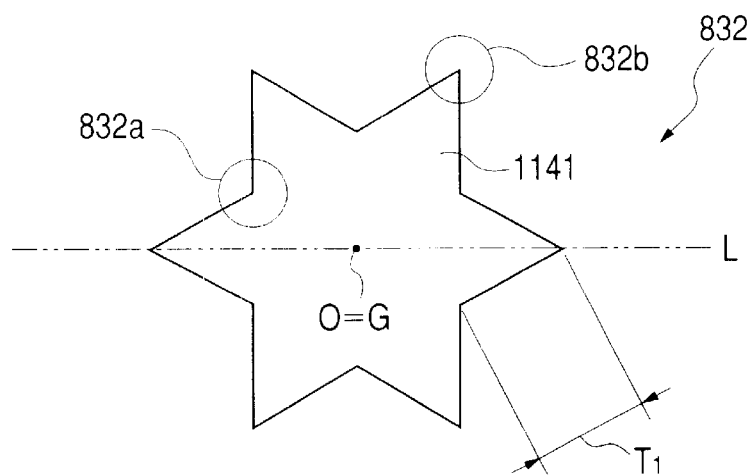
FIG. 11 is an enlarged view illustrating a part of the ejection openings shown in FIG. 10.
Figure 12:
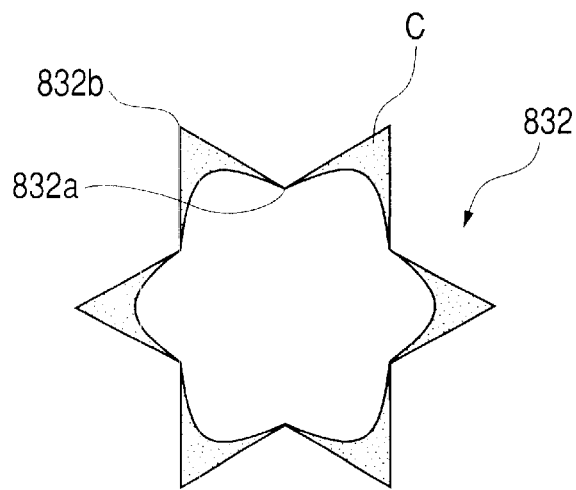
FIG. 12 typically illustrates a state that an ink has attached to the ejection opening portion shown in FIG. 11.

In this embodiment, the ejection opening part 940 is such that, for example, a section taken along a direction intersecting the thickness-wise direction thereof is in a form with 2 equilateral triangle having a side of 27 $\mu$m combined with each other in a state that one of them has been turned by 60 degrees. $T_1$ shown in FIG. 11 is 8 $\mu$m. The angles of the projected portions 832a are all 120 degrees, while the angles of the recessed portions 832b are all 60 degrees. Accordingly, the center O of the ejection opening consists with the center of gravity G of a polygon formed by connecting centers (center (center of gravity) of a figure formed by connecting the top of the groove and 2 bases adjacent to the top) of the grooves adjacent to each other. The opening area of the ejection opening 832 in this embodiment is 400 $\mu m^2$, and the opening area (area of the figure formed by connecting the top of the groove and 2 bases adjacent to the top) of the groove is about 33 $\mu m^2$ per groove. FIG. 12 is a typical drawing illustrating a state that an ink has attached to the ejection opening portion shown in FIG. 11.

An ejecting operation of a liquid by the ink-jet recording head of the above-described construction will hereinafter be described with reference to FIGS. 14 to 21.

Figure 14:
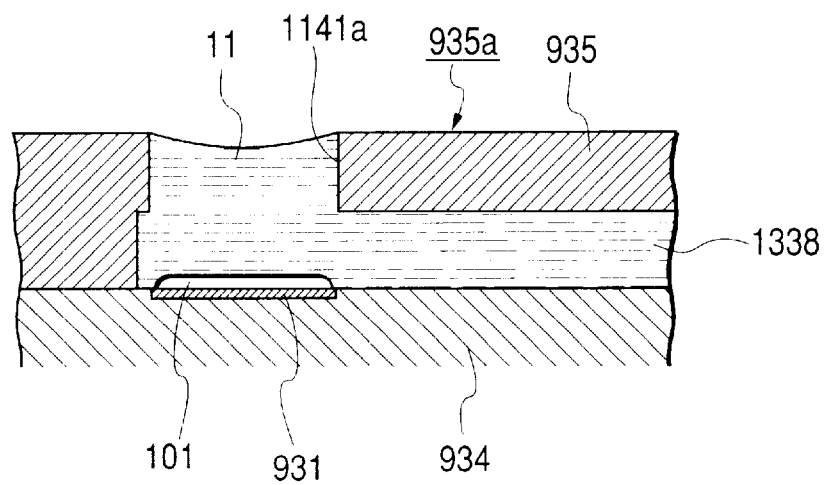
FIG. 14 is a schematic cross-sectional view corresponding to a sectional form taken along line 14—14 in FIG. 13 and illustrating an ejecting operation of a liquid in the liquid-ejecting head with time together with FIGS. 15 to 21.

FIGS. 14 to 21 are cross-sectional views for illustrating the ejecting operation of a liquid by the liquid-ejecting head shown in FIGS. 9 to 13 and are cross-sectional views of the bubbling chamber 1337 shown in FIG. 13 taken along line 14—14. In this section, an end of the ejection opening part 940 in the thickness-wise direction of the orifice plate is the top 1141a of a groove 1141. FIG. 14 illustrates a state that a film-like bubble has been formed on the heater, and FIGS. 15, 16, 17, 18, 19, 20 and 21 illustrate states after about 1 $\mu s$ from the state in FIG. 14, after about 2 $\mu s$ from the state in FIG. 14, after about 3 $\mu s$ from the state in FIG. 14, after about 4 $\mu s$ from the state in FIG. 14, after about 5 $\mu s$ from the state in FIG. 14, after about 6 $\mu s$ from the state in FIG. 14 and after about 7 $\mu s$ from the state in FIG. 14, respectively. Incidentally, in the following description, "drop" or "drop-in" does not mean drop in the so-called gravity direction, but means the movement in the direction of an electrothermal conversion element irrespective of the installing direction of a head.

Figure 15:
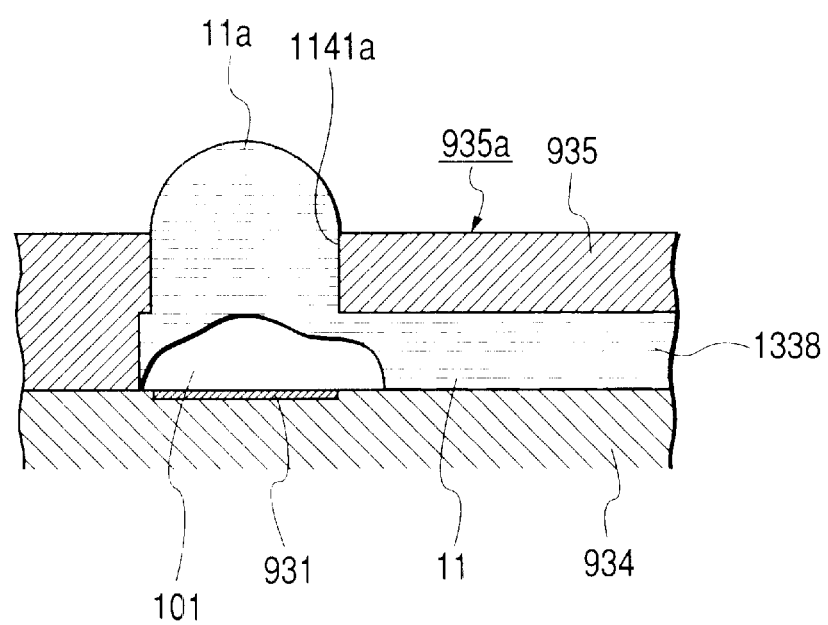
FIG. 15 is a schematic cross-sectional view corresponding to a sectional form taken along line 14—14 in FIG. 13 and illustrating an ejecting operation of the liquid in the liquid-ejecting head with time together with FIGS. 14 and 16 to 21.
Figure 16:
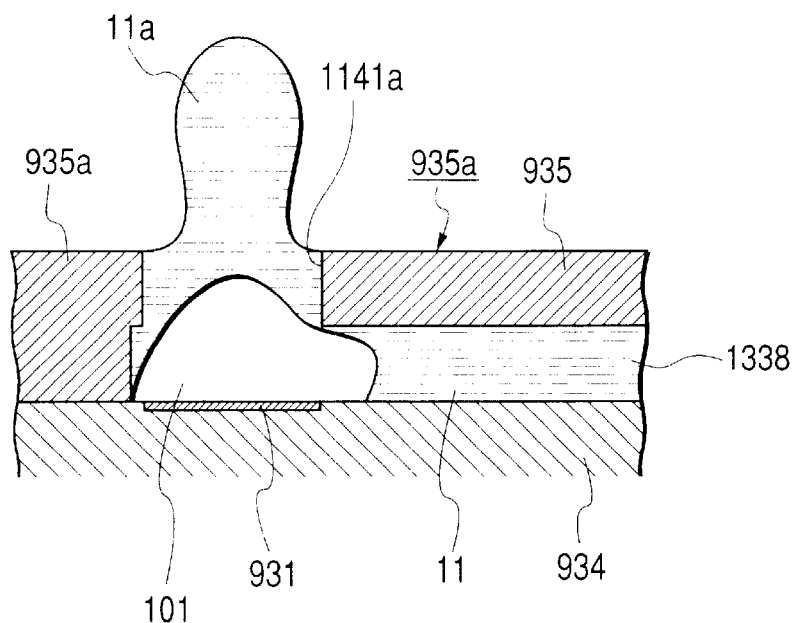
FIG. 16 is a schematic cross-sectional view corresponding to a sectional form taken along line 14—14 in FIG. 13 and illustrating an ejecting operation of the liquid in the liquid-ejecting head with time together with FIGS. 14, 15 and 17 to 21.
Figure 17:
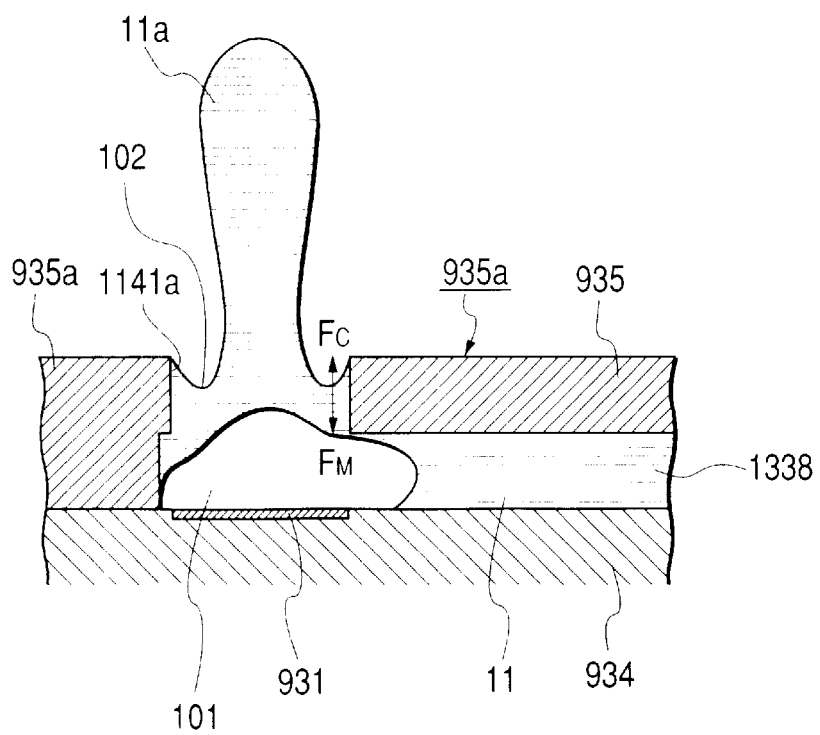
FIG. 17 is a schematic cross-sectional view corresponding to a sectional form taken along line 14—14 in FIG. 13 in the liquid-ejecting head and illustrating an ejecting operation of the liquid in the liquid-ejecting head with time together with FIGS. 14 to 16 and 18 to 21.

When a bubble 101 is first formed in a liquid flow path 1338 on a heater 931 by energizing the heater 931 on the basis of a recording signal or the like as illustrated in FIG. 14, the bubble quickly volumetrically expands and grows during about 2 $\mu s$ as illustrated in FIGS. 15 and 16. The height of the bubble 101 in the greatest volume exceeds the face 935a of an ejection opening. At this time, the pressure of the bubble decreases from one to several to one to several tens as high as the atmospheric pressure. At the time about 2 $\mu s$ have elapsed from the formation of the bubble, the volume of the bubble 101 turns from the greatest volume to decreased volume as described above, and at substantially the same time as this, the formation of a meniscus 102 is started. The meniscus 102 also recedes, i.e., drops in the direction of the heater 931 as illustrated in FIG. 17. In this embodiment, the ejection opening part has a plurality of grooves 1141 in a dispersed state, whereby capillary force acts in an opposite direction $F_C$ to the receding direction $F_M$ of the meniscus at the portion of the groove 1141 when the meniscus 102 recedes. As a result, the forms of the meniscus and a main droplet (hereinafter may be referred to as "liquid" or "ink" in some cases) 11a when the meniscus recedes are compensated so as to give substantially symmetrical forms to the center of the ejection opening even if some variation is observed in the state of the bubble 101 by some cause.

In this embodiment, the dropping velocity of this meniscus 102 is faster than the contracting velocity of the bubble 101, so that the bubble 101 communicates with the air in the vicinity of the lower surface of the ejection opening 832 at the time about 4 $\mu s$ have elapsed from the formation of the bubble as illustrated in FIG. 18. At this time, the liquid (ink) in the vicinity of the central axis of the ejection opening 832 drops toward the heater 931, because the liquid (ink) 11a pulled back on the side of the heater 931 by the negative pressure of the bubble 101 before the communication with the air retains the velocity in the direction toward the heater 931 by virtue of inertia even after the communication with the air. The liquid (ink) dropped toward the side of the heater 931 reaches the surface of the heater 931 at the time about 5 $\mu s$ have elapsed from the formation of the bubble as illustrated in FIG. 19, and spreads so as to cover the surface of the heater 931 as illustrated in FIG. 20. The liquid spread so as to cover the surface of the heater 931 as described above has a vector in a horizontal direction along the surface of the heater 931. However, a vector in a direction intersecting the surface of the heater 931, for example, vertical direction vanishes, so that the liquid intends to remain on the surface of the heater 931, thereby pulling a liquid located on the upper side than such a liquid, i.e., a liquid keeping a velocity vector in the ejecting direction, downward. Thereafter, a liquid portion 11b between the liquid spread on the surface of the heater 931 and the liquid (main droplet) located on the upper side becomes thin, and is broken in the center of the surface of the heater 931 at the time about 7 $\mu s$ have elapsed from the formation of the bubble as illustrated in FIG. 21, whereby the liquid is separated into a main droplet 11a keeping a velocity vector in the ejecting direction and a liquid 11c spread on the surface of the heater 931. The position of such separation is desirably the interior of the liquid flow path 1338, preferably a side closer to the electrothermal conversion element 931 than the ejection opening 832. The main droplet 11a is ejected from the central portion of the ejection opening 832 without deviation in the ejecting direction and ejection slippage and impacted at the prescribed position of a recording surface on a recording medium. The liquid 11c spread on the surface of the heater 931 is ejected as a satellite droplet following the main droplet up to now. However, it remains on the surface of the heater 931 without being ejected. Since the ejection of the satellite droplet can be prevented as described above, splash easy to occur by the ejection of the satellite droplet can be prevented, and staining of the recording surface on the recording medium with mist suspending in the form of fog can be surely prevented. In FIGS. 18 to 21, reference characters 11d and 11e indicate an ink (ink within the groove) attached to the groove portion and an ink remaining in the liquid flow path, respectively.

As described above, in the liquid-ejecting head according to this embodiment, the direction of the main droplet upon ejection can be stabilized by the plural grooves dispersed to the center of the ejection opening when the liquid is ejected at the stage that the volume of the bubble decreases after growing into the greatest volume. As a result, a liquid-ejecting head free of slippage in the ejecting direction and high in impact accuracy can be provided. In addition, ejection can be stably conducted against the variation of bubbling at high driving frequency, whereby high-speed and high-definition printing can be realized.

In particular, the liquid is ejected by communicating the bubble with the air for the first time at the stage that the volume of the bubble decreases, whereby mist occurred upon the ejection of the droplet by communicating the bubble with the air can be prevented, so that the state that droplets attach to the ejection opening face, which forms the main cause of the so-called sudden ejection failure, can also be inhibited.

As another embodiment of the recording head of the ejection system that a bubble is communicated with the air upon ejection, may be mentioned the so-called edge shooter type as described in, for example, Japanese Patent Registration No. 2783647.

As a preferred method and apparatus for conducting recording by using the inks according to the present invention, ink-jet recording making good use of mechanical energy may also be used in addition of the ink-jet recording method in which thermal energy corresponding to recording signals is applied to an ink within a recording head, and ink droplets are generated by the thermal energy.

In particular, the present invention has excellent effects in recording heads and recording apparatus of an ink-jet system that thermal energy is utilized to form a droplet to be ejected, thereby conducting recording, among the ink-jet recording systems.

With respect to the typical construction and principle thereof, those using the basic principle disclosed in, for example, U.S. Pat. Nos. 4,723,129 and 4,740,796 are preferred. This system may be applied to any of the so-called On-Demand type and continuous type. In particular, the On-Demand type is effective because at least one driving signal which corresponds to recording information and gives a rapid temperature rise exceeding nuclear boiling is applied to an electrothermal converter arranged corresponding to a sheet or liquid path, in which a liquid (ink) is held, thereby causing the electrothermal converter to generate thermal energy to cause film boiling on the heat-acting surface of a recording head, so that a bubble can be formed in the liquid (ink) in response to the driving signal in relation of one to one. The liquid (ink) is ejected through an ejection opening by the growth-contraction of this bubble to form at least one droplet. When the driving signal is applied in the form of a pulse, the growth-contraction of the bubble is suitably conducted in a moment, so that the ejection of the liquid (ink) excellent in responsiveness in particular can be achieved. It is therefore preferable to use such pulsed signals.

As the pulsed driving signal, such signals as described in U.S. Pat. Nos. 4,463,359 and 4,345,262 are suitable. When the conditions described in U.S. Pat. No. 4,313,124 that is an invention relating to the rate of temperature rise on the heat-acting surface are adopted, far excellent recording can be conducted.

As the construction of the recording head, such combined constructions (linear liquid flow path or perpendicular liquid flow path) of ejection openings, a liquid flow path and electrothermal converters as disclosed in the above-described publications, and besides constructions based on U.S. Pat. Nos. 4,558,333 and 4,459,600 which disclose the construction that a heat-acting portion is arranged in a curved region may also be included in the present invention.

In addition, constructions based on Japanese Patent Application Laid-Open No. 59-123670 which discloses the construction that a slit common to a plurality of electrothermal converters are used as an ejection part of the electrothermal converters, and Japanese Patent Application Laid-Open No. 59-138461 which discloses the construction that an opening absorbing pressure wave of thermal energy is provided in opposition to an ejection part may also be effective for the present invention.

Further, as a full-line type recording head having a length corresponding to the longest width of recording media, both construction that the length is met by such a combination of plural recording heads as disclosed in the above-described publications and construction as one recording head integrally formed may be used, and the above-described effects of the present invention can be more effectively exhibited.

In addition, the present invention is effective even when a replaceable, chip type recording head in which electrical connection to an apparatus body and the feed of an ink from the apparatus body become feasible by installing in the apparatus body, or a cartridge type recording head in which an ink tank is provided integrally in a recording head itself is used.

Further, the addition of recovery means for a recording head, preliminary auxiliary means, etc. which are provided as constitution of the recording apparatus according to the present invention is preferred because the effects of the present invention can be more stabilized. Specifically, capping means for the recording head, cleaning means, pressurizing or sucking means, preliminary heating means by electrothermal converters, other heating elements than these or combinations thereof, and preliminary ejection mode that ejection separate from recording is conducted may also be effective for stable recording.

As a recording mode of the recording apparatus, the present invention is extremely effective for not only recording mode using main colors such as black, but also apparatus equipped with at least one of complex color of different colors and full color by color mixing.

In the above-described embodiments of the present invention, the inks have been described as liquid. However, inks solidified at room temperature or lower may also be used so far as they are softened or liquid at a temperature higher than room temperature, or exhibit a liquid phase upon application of recording signals used because it is general in the above-described ink-jet systems that the temperature control of an ink itself is conducted to adjust the viscosity of the ink so as to fall within a stable ejection range.

In addition, inks that are liquefied by applying thermal energy according to recording signals and ejected as liquid inks, such as inks that temperature rise by thermal energy is positively prevented by using the thermal energy as energy for phase change from a solid phase to a liquid phase and inks solidified in a state left to stand for the purpose of preventing evaporation of the inks, and inks of a nature that they are liquefied for the first time by thermal energy, such as those already beginning to solidify at the time they reach a recording medium, may also be applied to the present invention. In such a case, the inks may be in a form that they are opposed to electrothermal converters in a state retained as a liquid or solid in recesses or through-holes in a porous sheet as described in Japanese Patent Application Laid-Open No. 54-56847 or 60-71260. In the present invention, the above-described film boiling system is most effective for the above-described inks.

Furthermore, as forms of the recording apparatus according to the present invention, forms that the apparatus is integrally or separately provided as an image output terminal for information processing instruments such as word processors and computers, and forms such as copying machines combined with a reader and facsimiles having a transmitting-receiving function may also be adopted.

The outline of a liquid-ejecting apparatus in which the above-described liquid-ejecting head is installed will hereinafter be described.

Figure 22:
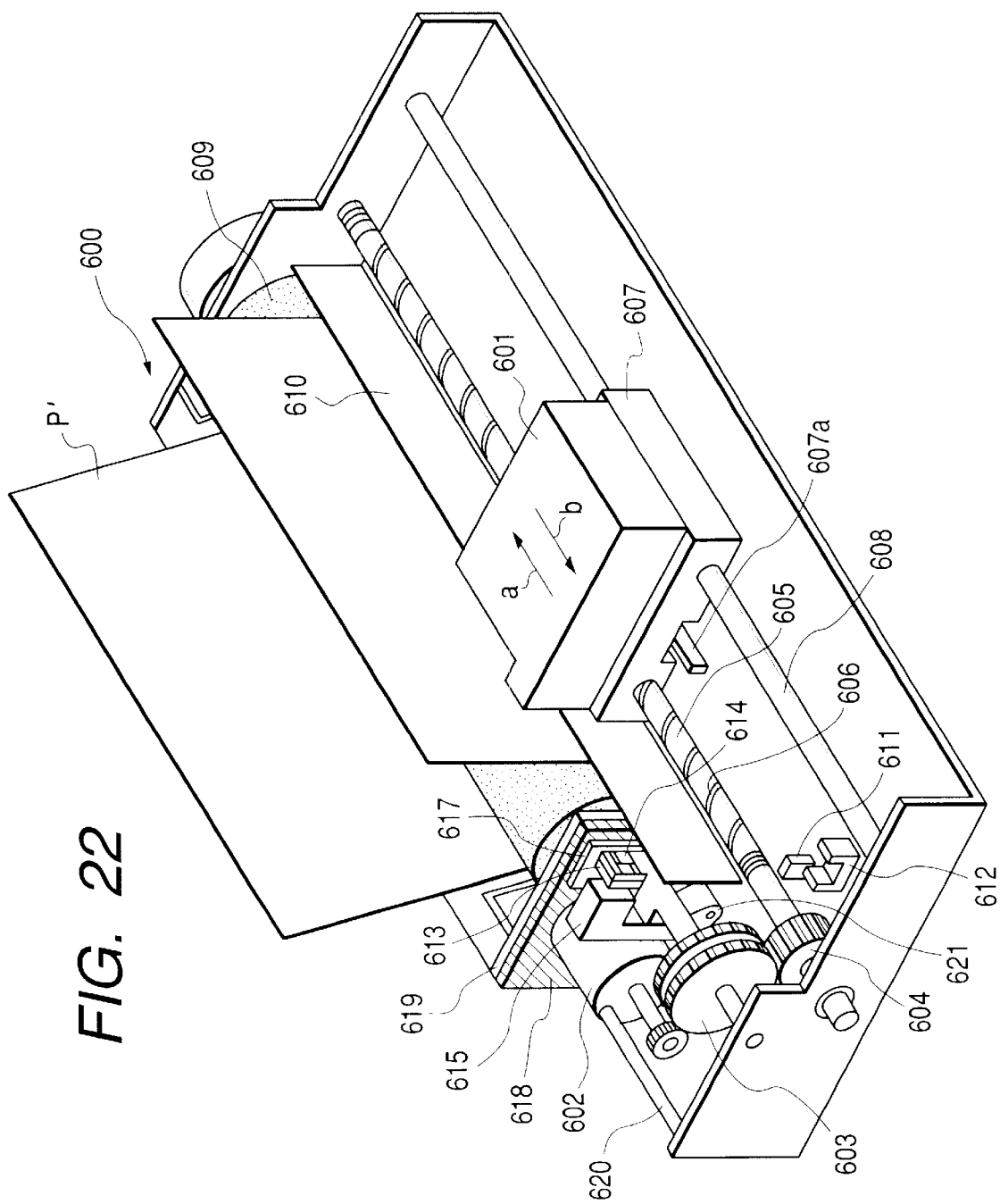
FIG. 22 illustrates the construction of an ink-jet recording apparatus to which the present invention can be applied.

FIG. 22 is a schematic perspective view of an ink-jet recording apparatus 600 which is an example of a liquid-ejecting apparatus to which the liquid-ejecting head according to the present invention can be installed and applied.

In FIG. 22, an ink-jet head cartridge 601 is so constructed that the above-described liquid-ejecting head is integrally formed with an ink tank with an ink to be fed to the liquid-ejecting head held therein. The ink-jet head cartridge 601 is mounted on a carriage 607 engaged with a spiral groove 606 in a leadscrew 605 rotating through driving force-transmitting gears 603 and 604 interlocking with the forward and reverse rotations of a driving motor 602 and reciprocatingly moved in directions shown by arrows a, b along a guide 608 together with the carriage 607 by the power of the driving motor 602. A recording medium P' is conveyed on a platen roller 609 by a recording medium-conveying means (not illustrated) and pressed against the platen roller 609 over the moving direction of the carriage 607 by a paper presser plate 610.

Photocouplers 611, 612 are arranged in the vicinity of an end of the leadscrew 605. These are home position-detecting means for confirming the presence of a lever 607a of the carriage 607 in this region to conduct change-over of the rotating direction of the driving motor 602, and the like.

A support member 613 serves to support a cap member 614 covering the front surface (ejection opening face) of the ink-jet head cartridge 601, in which ejection openings are present. An ink-sucking means 615 serves to suck an ink stored in the interior of the cap member 614 by empty ejection or the like from the ink-jet head cartridge 601. By this ink-sucking means 615, suction recovery of the ink-jet head cartridge 601 is conducted through an opening 616 in the cap. A cleaning blade 617 for wiping the ejection opening face of the ink-jet head cartridge 601 is provided movably in forward and backward directions (directions perpendicular to the moving directions of the carriage 607) by a moving member 618. These cleaning blade 617 and moving member 618 are supported by a body support 619. The cleaning blade 617 is not limited to this form, and any other well-known cleaning blade may be used.

Upon the suction recovery operation of the liquid-ejecting head, a lever 620 for initiating suction is moved with the movement of a cam 621 engaged with the carriage 607, and the driving power from the driving motor 602 is transfer-controlled by a publicly known means such as clutch shift. An ink-jet recording control part for applying a signal to a heater provided in the liquid-ejecting head of the ink-jet head cartridge 601 and conducting drive control of the above-described respective mechanisms is provided on the side of the apparatus body and not illustrated here.

The ink-jet recording apparatus 600 having the above-described construction conducts recording on the recording medium P' conveyed on the platen roller 609 by the recording medium-conveying means (not illustrated) while reciprocatingly moving the ink-jet head cartridge 601 over the full width of the recording medium P'.

The present invention will hereinafter be described more specifically by the following Examples and Comparative Examples. Incidentally, all designations of "part" or "parts" and "%" as will be used in the following examples mean part or parts by weight and % by weight unless expressly noted.

EXAMPLE 1

The following components were mixed and thoroughly stirred into a solution. The resultant solution was then filtered under pressure through a Fluoropore Filter (trade name; product of Sumitomo Electric Industries, Ltd.) having a pore size of 0.45 μm, thereby preparing a cyan ink according to EXAMPLE 1.

| [Composition of the cyan ink according to EXAMPLE 1] | |
|---|---|
| L-720 (trade name, product of Nippon Unicar Co., Ltd.; solubility in water at 25° C.: at least 20%; having an anti-foaming effect) | 0.01 parts |
| Ethylene oxide adduct of acetylene glycol (Acetylenol EH, trade name, product of Kawaken Fine Chemicals Co., Ltd.) | 1 parts |
| Glycerol | 8 parts |
| Ethylene glycol | 7 parts |
| Urea | 5 parts |
| C.I. Direct Blue 199 | 5 parts |
| Water | 73.99 parts. |

EXAMPLE 2

An ink according to EXAMPLE 3 was prepared in the same manner as in EXAMPLE 1 except that L-720 in the composition of EXAMPLE 1 was replaced with FZ-2162 (trade name, product of Nippon Unicar Co., Ltd.; solubility in water at 25° C.: at least 20%; having no anti-foaming effect).

EXAMPLE 3

An ink according to EXAMPLE 3 was prepared in the same manner as in EXAMPLE 1 except that L-720 in the composition of EXAMPLE 1 was replaced with FZ-2123 (trade name, product of Nippon Unicar Co., Ltd.; solubility in water at 25° C.: lower than 1%; having an anti-foaming effect).

EXAMPLE 4

An ink according to EXAMPLE 4 was prepared in the same manner as in EXAMPLE 1 except that L-720 in the composition of EXAMPLE 1 was replaced with L-77 (trade name, product of Nippon Unicar Co., Ltd.; solubility in water at 25° C.: lower than 1%; having no anti-foaming effect).

COMPARATIVE EXAMPLE 1

An ink according to COMPARATIVE EXAMPLE 1 was prepared in the same manner as in EXAMPLE 4 except that the amount of L-77 added in the composition of EXAMPLE 4 was changed to 1 part, and the amount of water was adjusted correspondingly to 100 parts in total.

COMPARATIVE EXAMPLE 2

An ink according to COMPARATIVE EXAMPLE 2 was prepared in the same manner as in EXAMPLE 1 except that L-720 and the ethylene oxide adduct of acetylene glycol in the composition of EXAMPLE 1 were replaced with purified water.

Features of the inks obtained in the above examples and comparative examples are shown collectively in Table 1.

TABLE 1

| | Silicon-containing surfactant | Solubility of silicon-containing surfactant (25° C.) | Anti-foaming effect | Ethylene oxide adduct of acetylene glycol | Ratio |
|---|---|---|---|---|---|
| Ex. 1 | Added (L-720) | At least 20% | Having | Added | 1/100 |
| Ex. 2 | Added (FZ-2162) | At least 20% | None | Added | 1/100 |
| Ex. 3 | Added (FZ-2123) | Lower than 1% | Having | Added | 1/100 |
| Ex. 4 | Added (L-77) | Lower than 1% | None | Added | 1/100 |
| Comp. Ex. 1 | Added (L-77) | Lower than 1% | None | Added | 1 |
| Comp. Ex. 2 | Not added | — | — | Not added | — |

(Evaluation Methods and Evaluation Results)
(1) Evaluation of Stability to Start-up Ejection:

An ink-jet printer (modified machine of BJF-600 (trade name, manufactured by Canon Inc.)) was left to stand for at least 1 hour in a thermo-hygrostat controlled at a temperature of 15° C. and a relative humidity of 10%. Thereafter, ink droplets were ejected from a certain nozzle, ejection of ink droplets from the nozzle was stopped for 20 seconds, and an ink droplet was then ejected from the nozzle to visually evaluate the degree of ejection stability at this time.

As a result, the stability to start-up ejection of the inks according to EXAMPLEs 1 to 4 was clearly improved compared with the ink of COMPARATIVE EXAMPLE 1 containing no silicon-containing surfactant.

(2) Evaluation of Stability to the Second Start-up Ejection and Stability to the Start-up Ejection Following the Second Start-up Ejection:

The ink-jet printer was left to stand for at least 1 hour in a thermo-hygrostat controlled at a temperature of 15° C. and a relative humidity of 10%. Thereafter, ink droplets were ejected from a certain nozzle, ejection of ink droplets from the nozzle was stopped for 40 seconds, and 15 ink droplets were then ejected from the nozzle to visually evaluate the degrees of ejection stabilities of the second and third ink droplets at this time.

As a result, the stability to the second start-up ejection and the stability to the start-up ejection following the second start-up ejection of the inks according to EXAMPLEs 1 to 4, in which a weight ratio of the silicon-containing surfactant to the ethylene oxide adduct of acetylene glycol was controlled to 1/100, were better than the inks of COMPARATIVE EXAMPLEs 1 and 2.

(3) Evaluation of Ejection Stability Upon Continuous Ejection Under an Environment of Low Temperature and Low Humidity:

The ink-jet printer was left to stand for at least 1 hour in a thermo-hygrostat controlled at a temperature of 15° C. and a relative humidity of 10%. Thereafter, ink droplets were continuously ejected from all nozzles to print a solid printed image, thereby visually evaluating the ejection stability from the degree of blur in the solid printed image.

As a result, the solid printed images formed with the inks of COMPARATIVE EXAMPLEs 1 and 2 clearly blurred, and so the ejection stability of the inks was poor, while the solid printed images formed with the inks according to EXAMPLEs 1 to 4 involved no problem.

EXAMPLE 5

An ink set composed of the following cyan ink, magenta ink and yellow ink was provided. These inks were charged into respective ink tanks of a color ink-jet printer (modified machine of BJF-600 (trade name, manufactured by Canon Inc.)), and the ink tanks were installed in the printer to conduct evaluation as to the following start-up ejection performance.

Cyan Ink:

The cyan ink according to EXAMPLE 1.

Magenta Ink:

A magenta ink was prepared in the same manner as in EXAMPLE 1 except that C.I. Direct Blue 199, which was a dye in the cyan ink used in EXAMPLE 1, was replaced with a dye represented by the following structural formula:

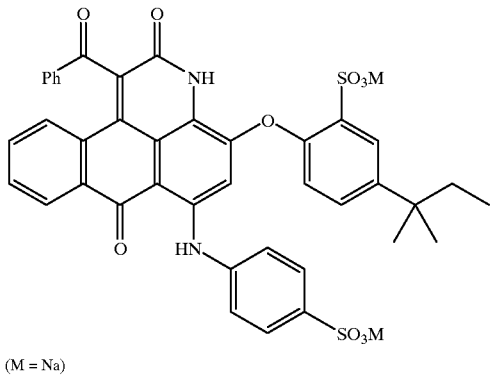

(M = Na)

Yellow Ink:

A yellow ink was prepared in the same manner as in EXAMPLE 1 except that C.I. Direct Blue 199, which was a dye in the cyan ink used in EXAMPLE 1, was replaced with C.I. Direct Yellow 86.

| Ink set of EXAMPLE 5 | | | |
|---|---|---|---|
| | Cyan | Magenta | Yellow |
| Silicon-containing surfactant | L-720 | L-720 | Not added |
| Ethylene oxide adduct of acetylene glycol | Added | Added | Added |
| Ratio | 1/100 | 1/100 | — |

COMPARATIVE EXAMPLE 3

An ink set composed of the following cyan ink, magenta ink and yellow ink was provided. These inks were charged into the respective ink tanks of the color ink-jet printer to conduct evaluation as to the following start-up ejection performance.

Cyan Ink:

A cyan ink prepared by removing L-720 from the cyan ink according to EXAMPLE 5 and replacing it by purified water.

Magenta Ink:

A magenta ink prepared by removing L-720 from the magenta ink according to EXAMPLE 5 and replacing it by purified water.

Yellow Ink:

The yellow ink according to EXAMPLE 5.

| Ink set of COMPARATIVE EXAMPLE 3 | | | |
|---|---|---|---|
| | Cyan | Magenta | Yellow |
| Silicon-containing surfactant | Not added | Not added | Not added |
| Ethylene oxide adduct of acetylene glycol | Added | Added | Added |
| Ratio | — | — | — |

(4) Evaluation of Ink Sets of EXAMPLE 5 and COMPARATIVE EXAMPLE 3 as to Ink-jet Suitability Viewed from Stability to Start-up Ejection:

With respect to the ink sets of EXAMPLE 5 and COMPARATIVE EXAMPLE 3, the evaluation as to the stability to start-up ejection was conducted in the same conditions as in the item (1). As a result, the start-up ejection performance of the respective inks in the ink set according to EXAMPLE 5 was substantially the same, and so sequence was able to be preset at a high level when the ink set was used as an ink set for ink-jet. On the other hand, in the ink set according to COMPARATIVE EXAMPLE 3, the deterioration of stability to start-up ejection was scarcely observed on the yellow ink. However, the deterioration of stability to start-up ejection was observed on both cyan ink and magenta ink. More specifically, scattering of start-up ejection performance occurred among the three inks making up the ink set of COMPARATIVE EXAMPLE 3. Accordingly, when the ink set of COMPARATIVE EXAMPLE 3 was installed in the ink-jet printer, the ink set was able to be used only in sequence hard to say it to be at a high level, leading to conclusion that the ink set according to EXAMPLE 5 is clearly excellent in ink-jet suitability compared with the ink set of COMPARATIVE EXAMPLE 3. Incidentally, the term "sequence at a high level" as used herein specifically means that the frequency of recovery operation can be lessened, and so on.

According to the present invention, as described above, there can be provided inks which are excellent in stability to start-up ejection, stability to second start-up ejection and stability to an ejection following the second start-up ejection and moreover excellent in ejection stability when continuously ejected under an environment of a low temperature and a low humidity and can conduct recording with high reliability without any problem even when used in an ink-jet recording system. When ink-jet recording is conducted with such inks, there can be provided high-quality images excellent in stability to start-up ejection, stability to second start-up ejection and stability to an ejection following the second start-up ejection and moreover ejection stability when continuously ejected under an environment of a low temperature and a low humidity.

According to the present invention, start-up ejection performance between a plurality of color inks installed in a color ink-jet printer can be made even, and so sequence in ink-jet recording can be preset at a high level. As a result, high-quality color images can be formed at a high speed.

What is claimed is:

1. An ink comprising a dye, a silicon-containing surfactant, an ethylene oxide adduct of acetylene glycol and a liquid medium, wherein a weight ratio of the silicon-containing surfactant to the ethylene oxide adduct of acetylene glycol is not lower than $1/5000$, but lower than $1/20$.

2. The ink according to claim 1, wherein the silicon-containing surfactant has a siloxane bond.

3. The ink according to claim 1 or 2, wherein the silicon-containing surfactant is contained in an amount of 0.001 to 4.5% by weight based on the total weight of the ink.

4. The ink according to claim 1 or 2, wherein the silicon-containing surfactant is contained in an amount of 0.01 to 4.5% by weight based on the total weight of the ink.

5. The ink according to claim 1 or 2, being an ink for ink-jet recording.

6. The ink according to claim 3, being an ink for ink-jet recording.

7. The ink according to claim 4, being an ink for ink-jet recording.

8. An ink-jet recording process, comprising the step of ejecting the ink according to claim 5 with an ink-jet system.

9. The process according to claim 8, wherein the ink-jet system comprises the step of applying thermal energy to the ink.

10. An ink-jet recording process, comprising the step of ejecting the ink according to claim 6 with an ink-jet system.

11. The process according to claim 10, wherein the ink-jet system comprises the step of applying thermal energy to the ink.

12. An ink-jet recording process, comprising the step of ejecting the ink according to claim 7 with an ink-jet system.

13. The process according to claim 12, wherein the ink-jet system comprises the step of applying thermal energy to the ink.

14. An ink cartridge, comprising an ink container portion containing the ink according to claim 1.

15. The ink cartridge according to claim 14, wherein the ink container portion is provided with a surface with which the ink comes into contact, the surface comprising at least one selected from the group consisting of polypropylene, polyurethan, cellulose and polyvinyl acetate.

16. An ink cartridge, comprising an ink container portion containing the ink according to claim 3.

17. The ink cartridge according to claim 16, wherein the ink container portion is provided with a surface with which the ink comes into contact, the surface comprising at least one selected from the group consisting of polypropylene, polyurethan, cellulose and polyvinyl acetate.

18. An ink cartridge, comprising an ink container portion containing the ink according to claim 4.

19. The ink cartridge according to claim 18, wherein the ink container portion is provided with a surface with which the ink comes into contact, the surface comprising at least one selected from the group consisting of polypropylene, polyurethan, cellulose and polyvinyl acetate.

20. An ink cartridge, comprising an ink container portion containing the ink according to claim 5.

21. The ink cartridge according to claim 20, wherein the ink container portion is provided with a surface with which the ink comes into contact, the surface comprising at least one selected from the group consisting of polypropylene, polyurethan, cellulose and polyvinyl acetate.

22. An ink cartridge, comprising an ink container portion containing the ink according to claim 6.

23. The ink cartridge according to claim 22, wherein the ink container portion is provided with a surface with which the ink comes into contact, the surface comprising at least one selected from the group consisting of polypropylene, polyurethan, cellulose and polyvinyl acetate.

24. An ink cartridge, comprising an ink container portion containing the ink according to claim 7.

25. The ink cartridge according to claim 24, wherein the ink container portion is provided with a surface with which the ink comes into contact, the surface comprising at least one selected from the group consisting of polypropylene, polyurethan, cellulose and polyvinyl acetate.

26. A recording unit, comprising an ink container portion containing the ink according to claim 5; and a recording head for ejecting the ink by an ink-jet system.

27. The recording unit according to claim 26, wherein the recording head is comprised of a heater for applying thermal energy to the ink.

28. The recording unit according to claim 27, wherein the ink container portion is provided with a surface with which the ink comes into contact, the surface comprising at least one selected from the group consisting of polypropylene, polyurethan, cellulose and polyvinyl acetate.

29. The recording unit according to claim 26, wherein the ink container portion is provided with a surface with which the ink comes into contact, the surface comprising at least one selected from the group consisting of polypropylene, polyurethan, cellulose and polyvinyl acetate.

30. A recording unit, comprising an ink container portion containing the ink according to claim 6; and a recording head for ejecting the ink by an ink-jet system.

31. The recording unit according to claim 30, wherein the recording head is comprised of a heater for applying thermal energy to the ink.

32. The recording unit according to claim 31, wherein the ink container portion is provided with a surface with which the ink comes into contact, the surface comprising at least one selected from the group consisting of polypropylene, polyurethan, cellulose and polyvinyl acetate.

33. The recording unit according to claim 30, wherein the ink container portion is provided with a surface with which the ink comes into contact, the surface comprising at least one selected from the group consisting of polypropylene, polyurethan, cellulose and polyvinyl acetate.

34. A recording unit, comprising an ink container portion containing the ink according to claim 7; and a recording head for ejecting the ink by an ink-jet system.

35. The recording unit according to claim 34, wherein the recording head is comprised of a heater for applying thermal energy to the ink.

36. The recording unit according to claim 35, wherein the ink container portion is provided with a surface with which the ink comes into contact, the surface comprising at least one selected from the group consisting of polypropylene, polyurethan, cellulose and polyvinyl acetate.

37. The recording unit according to claim 34, wherein the ink container portion is provided with a surface with which the ink comes into contact, the surface comprising at least one selected from the group consisting of polypropylene, polyurethan, cellulose and polyvinyl acetate.

38. An ink-jet recording apparatus, comprising an ink container portion containing the ink according to claim 5; and a recording head for ejecting the ink by an ink-jet system.

39. The ink-jet recording apparatus according to claim 38, wherein the recording head is comprised of a heater for applying thermal energy to the ink.

40. The ink-jet recording apparatus according to claim 39, wherein the ink container portion is provided with a surface with which the ink comes into contact, the surface comprising at least one selected from the group consisting of polypropylene, polyurethan, cellulose and polyvinyl acetate.

41. The ink-jet recording apparatus according to claim 38, wherein the ink container portion is provided with a surface with which the ink comes into contact, the surface comprising at least one selected from the group consisting of polypropylene, polyurethan, cellulose and polyvinyl acetate.

42. An ink-jet recording apparatus, comprising an ink container portion containing the ink according to claim 6; and a recording head for ejecting the ink by an ink-jet system.

43. The ink-jet recording apparatus according to claim 42, wherein the recording head is comprised of a heater for applying thermal energy to the ink.

44. The ink-jet recording apparatus according to claim 43, wherein the ink container portion is provided with a surface with which the ink comes into contact, the surface comprising at least one selected from the group consisting of polypropylene, polyurethan, cellulose and polyvinyl acetate.

45. The ink-jet recording apparatus according to claim 42, wherein the ink container portion is provided with a surface with which the ink comes into contact, the surface comprising at least one selected from the group consisting of polypropylene, polyurethan, cellulose and polyvinyl acetate.

46. An ink-jet recording apparatus, comprising an ink container portion containing the ink according to claim 7; and a recording head for ejecting the ink by an ink-jet system.

47. The ink-jet recording apparatus according to claim 46, wherein the recording head is comprised of a heater for applying thermal energy to the ink.

48. The ink-jet recording apparatus according to claim 47, wherein the ink container portion is provided with a surface with which the ink comes into contact, the surface comprising at least one selected from the group consisting of polypropylene, polyurethan, cellulose and polyvinyl acetate.

49. The ink-jet recording apparatus according to claim 46, wherein the ink container portion is provided with a surface with which the ink comes into contact, the surface comprising at least one selected from the group consisting of polypropylene, polyurethan, cellulose and polyvinyl acetate.

50. An ink set, comprising in combination a first dye having a color tone, and a second dye ink having a color tone different from that of the first dye ink, wherein at least one of the first and second dye inks is the ink according to claim 1.

51. The ink set according to claim 50, being an ink set for ink-jet.

52. An ink set, comprising in combination a first dye having a color tone, and a second dye ink having a color tone different from that of the first dye ink, wherein at least one of the first and second dye inks is the ink according to claim 5.

53. The ink set according to claim 52, being an ink set for ink-jet.

54. An ink set, comprising in combination a first dye having a color tone, and a second dye ink having a color tone different from that of the first dye ink, wherein at least one of the first and second dye inks is the ink according to claim 3.

55. The ink set according to claim 54, being an ink set for ink-jet.

56. An ink set, comprising in combination a first dye having a color tone, and a second dye ink having a color tone different from that of the first dye ink, wherein at least one of the first and second dye inks is the ink according to claim 6.

57. The ink set according to claim 56, being an ink set for ink-jet.

58. An ink set, comprising in combination a first dye having a color tone, and a second dye ink having a color tone different from that of the first dye ink, wherein at least one of the first and second dye inks is the ink according to claim 4.

59. The ink set according to claim 58, being an ink set for ink-jet.

60. An ink set, comprising in combination a first dye having a color tone, and a second dye ink having a color tone different from that of the first dye ink, wherein at least one of the first and second dye inks is the ink according to claim 7.

61. The ink set according to claim 60, being an ink set for ink-jet.

62. An ink-jet recording apparatus, comprising an ink container portion containing the inks comprised in the ink set according to claim 50 and ink-jet recording head for ejecting the respective inks.

63. An ink-jet recording apparatus, comprising an ink container portion containing the inks comprised in the ink set according to claim 51 and ink-jet recording head for ejecting the respective inks.

64. An ink-jet recording apparatus, comprising an ink container portion containing the inks comprised in the ink set according to claim 52 and ink-jet recording head for ejecting the respective inks.

65. An ink-jet recording apparatus, comprising an ink container portion containing the inks comprised in the ink set according to claim 53 and ink-jet recording head for ejecting the respective inks.

66. An ink-jet recording apparatus, comprising an ink container portion containing the inks comprised in the ink set according to claim 54 and ink-jet recording head for ejecting the respective inks.

67. An ink-jet recording apparatus, comprising an ink container portion containing the inks comprised in the ink set according to claim 55 and ink-jet recording head for ejecting the respective inks.

68. An ink-jet recording apparatus, comprising an ink container portion containing the inks comprised in the ink set according to claim 56 and ink-jet recording head for ejecting the respective inks.

69. An ink-jet recording apparatus, comprising an ink container portion containing the inks comprised in the ink set according to claim 57 and ink-jet recording head for ejecting the respective inks.

70. An ink-jet recording apparatus, comprising an ink container portion containing the inks comprised in the ink set according to claim 58 and ink-jet recording head for ejecting the respective inks.

71. An ink-jet recording apparatus, comprising an ink container portion containing the inks comprised in the ink set according to claim 59 and ink-jet recording head for ejecting the respective inks.

72. An ink-jet recording apparatus, comprising an ink container portion containing the inks comprised in the ink set according to claim 60 and ink-jet recording head for ejecting the respective inks.

73. An ink-jet recording apparatus, comprising an ink container portion containing the inks comprised in the ink set according to claim 61 and ink-jet recording head for ejecting the respective inks.

74. An ink set, comprising dye inks of yellow, magenta and cyan, wherein the dye inks comprise an ethylene oxide adduct of acetylene glycol respectively, and the dye inks of magenta and cyan further comprise a silicon-containing surfactant.

75. The ink set according to claim 74, being an ink set for ink-jet.

76. An ink-jet recording apparatus, comprising an ink container portion containing the inks comprised in the ink set according to claim 74 or 75 and ink-jet recording head for ejecting the respective inks.

77. A method of improving stability to start-up ejection of an ink for ink-jet printing comprising a step of ejecting the ink, wherein the ink comprises an ethylene oxide adduct of acetylene glycol, a dye and a silicon-containing surfactant.

78. The method according to claim 77, wherein the ink exhibits excellent stability to start-up ejection even under conditions such that the ink containing no silicon-containing surfactant becomes unstable in start-up ejection.

79. An ink for ink-jet printing, comprising an ethylene oxide adduct of acetylene glycol, a dye and a silicon-containing surfactant, wherein the ink exhibits excellent stability to start-up ejection even under conditions such that the ink containing no silicon-containing surfactant becomes unstable in start-up ejection.

* * * * *

UNITED STATES PATENT AND TRADEMARK OFFICE
CERTIFICATE OF CORRECTION

PATENT NO. : 6,474,804 B2
DATED : November 5, 2002
INVENTOR(S) : Osumi et al.

It is certified that error appears in the above-identified patent and that said Letters Patent is hereby corrected as shown below:

Title page,
Item [57], ABSTRACT,
Line 3, "comprise" should read -- comprising --;
Lines 9, 12 and 17, "include" should read -- including --.

Column 24,
Lines 34, 41, 48, 55 and 62, "polyurethan" should read -- polyurethane --.

Column 25,
Lines 2, 13, 18, 29 and 34, "polyurethan" should read -- polyurethane --.
Lines 45, 50, 62 and 67, "polyurethan" should read -- polyurethane --.

Column 26,
Lines 12, 17, 29 and 34, "polyurethan" should read -- polyurethane --.

Signed and Sealed this

Eighth Day of July, 2003

JAMES E. ROGAN
*Director of the United States Patent and Trademark Office*